United States Patent
Yaguchi et al.

(10) Patent No.: US 11,242,436 B2
(45) Date of Patent: Feb. 8, 2022

(54) RESIN PARTICLES, PRODUCTION METHOD THEREOF, AND APPLICATION THEREOF FOR PRODUCTION OF THREE-DIMENSIONAL OBJECT

(71) Applicant: RICOH COMPANY, LTD., Tokyo (JP)

(72) Inventors: Shigenori Yaguchi, Tokyo (JP); Yasuyuki Yamashita, Kanagawa (JP); Akira Saito, Kanagawa (JP); Kiichi Kamoda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 407 days.

(21) Appl. No.: 16/351,092

(22) Filed: Mar. 12, 2019

(65) Prior Publication Data
US 2019/0284351 A1  Sep. 19, 2019

(30) Foreign Application Priority Data

Mar. 15, 2018 (JP) .............................. JP2018-047520
Jun. 26, 2018 (JP) .............................. JP2018-120561

(51) Int. Cl.
*C08J 5/04* (2006.01)
*B29C 70/62* (2006.01)
(Continued)

(52) U.S. Cl.
CPC ................ *C08J 5/042* (2013.01); *B29B 9/14* (2013.01); *B29B 9/16* (2013.01); *B29C 64/20* (2017.08); *B29C 64/314* (2017.08); *B29C 64/40* (2017.08); *B29C 70/62* (2013.01); *C08J 3/12* (2013.01); *C08J 5/043* (2013.01); *B29B 9/06* (2013.01);
(Continued)

(58) Field of Classification Search
CPC ......... Y10T 428/2927; Y10T 428/2964; Y10T 428/2952; Y10T 428/2998; C08J 3/12; C08J 2377/10; C08J 2377/08; C08J 2359/00; C08J 2377/00; C08J 5/042; C08J 5/043; B28B 1/001; B29K 2105/251; B29K 2077/00; B29K 2059/00; C08L 71/00; C08L 9/00; C08L 77/06; C08L 77/10;
(Continued)

(56) References Cited

U.S. PATENT DOCUMENTS 2,877,501 A  3/1959 Bradt
4,944,965 A  7/1990 Luxon et al.
(Continued)

FOREIGN PATENT DOCUMENTS

JP  60-152408 U  10/1985
JP  H04212810    8/1992
(Continued)

OTHER PUBLICATIONS

U.S. Appl. No. 16/056,855, filed Aug. 7, 2018.
(Continued)

*Primary Examiner* — Camie S Thompson
(74) *Attorney, Agent, or Firm* — Grüneberg and Myers, PLLC

(57) ABSTRACT

Provided are resin particles including columnar resin particles each including filaments of a fibrous material, wherein the filaments of the fibrous material are aligned in an axial direction of each of the columnar resin particles.

18 Claims, 9 Drawing Sheets

Figure 1:
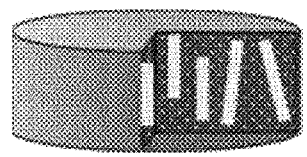

(51) Int. Cl.
*C08J 3/12* (2006.01)
*B29C 64/40* (2017.01)
*B29B 9/16* (2006.01)
*B29C 64/20* (2017.01)
*B29C 64/314* (2017.01)
*B29B 9/14* (2006.01)
*B29B 9/06* (2006.01)

(52) U.S. Cl.
CPC ........ *C08J 2359/00* (2013.01); *C08J 2367/02* (2013.01); *C08J 2371/10* (2013.01); *C08J 2377/00* (2013.01)

(58) Field of Classification Search
CPC ... C08L 77/02; B29B 9/06; B29B 9/12; B29B 9/14; B29B 9/16; B29C 64/40; B29C 70/62
USPC ........... 264/143, 257; 427/221, 389.7, 389.8, 427/389.9; 428/372, 392, 407, 396
See application file for complete search history.

(56) References Cited

U.S. PATENT DOCUMENTS

| | | | |
|---|---|---|---|
| 5,091,255 A * | 2/1992 | Hsu | B29B 9/14 428/299.4 |
| 6,531,086 B1 | 3/2003 | Larsson | |
| 7,794,647 B1 | 9/2010 | Deckard | |
| 2007/0292689 A1 | 12/2007 | Pavlinec | |
| 2011/0143108 A1 | 6/2011 | Fruth et al. | |
| 2014/0370323 A1 | 12/2014 | Ackelid | |
| 2016/0177122 A1 | 6/2016 | Naruse et al. | |
| 2016/0236412 A1 | 8/2016 | Kusahara et al. | |
| 2016/0271877 A1 | 9/2016 | Suzuki et al. | |
| 2016/0271879 A1 | 9/2016 | Yamashita et al. | |
| 2017/0209927 A1 | 7/2017 | Yamashita et al. | |
| 2017/0217087 A1 | 8/2017 | Tamoto et al. | |
| 2017/0225404 A1 | 8/2017 | Naruse et al. | |
| 2018/0001520 A1 | 1/2018 | Saito et al. | |
| 2018/0022024 A1 | 1/2018 | Saito et al. | |
| 2018/0023219 A1 | 1/2018 | Saito et al. | |
| 2018/0147780 A1 | 5/2018 | Kamoda et al. | |
| 2018/0264720 A1 | 9/2018 | Tamoto et al. | |
| 2018/0264721 A1 | 9/2018 | Iida et al. | |
| 2018/0273756 A1 | 9/2018 | Saito et al. | |
| 2018/0281232 A1 | 10/2018 | Devaraj et al. | |
| 2018/0355144 A1 | 12/2018 | Saito et al. | |
| 2019/0047220 A1 | 2/2019 | Ojima | |

FOREIGN PATENT DOCUMENTS

| | | |
|---|---|---|
| JP | 6-23742 A | 2/1994 |
| JP | 2004148601 | 5/2004 |
| JP | 2009-221427 A | 10/2009 |
| JP | 4739507 | 5/2011 |
| JP | 2012040811 | 3/2012 |
| JP | 2013063641 | 4/2013 |
| JP | 6101707 | 3/2017 |
| JP | WO2017/112723 A1 | 6/2017 |
| JP | 2017-149004 | 8/2017 |
| JP | 2017527474 | 9/2017 |
| JP | 2018-015972 | 2/2018 |
| JP | 2018-111304 | 7/2018 |
| JP | 2018-154093 | 10/2018 |
| JP | 2018-158571 | 10/2018 |
| JP | 2018-196983 | 12/2018 |
| JP | 2018-196984 | 12/2018 |
| WO | WO2018/173755 A1 | 9/2018 |

OTHER PUBLICATIONS

U.S. Appl. No. 16/184,244, filed Nov. 8, 2018.
U.S. Appl. No. 16/268,529, filed Feb. 6, 2019.
Extended European Search Report dated Oct. 23, 2019 in European Patent Application No. 19160739.9, 10 pages.
Japanese Office Action dated Dec. 7, 2021 in Japanese Application No. 2018-120561, with English translation, 8 pages.

* cited by examiner ature lower than the usual processing temperature of the sample, the sample is cut with a single blade, such as a razor, and the obtained cutting face is used as an observation face. As measuring devices, scanning electron microscopes (e.g., SU8230, available from Hitachi High-Technologies Corporation) can be used.

In the columnar resin particles, a diameter of each of the columnar resin particles is preferably 20 μm or greater but 200 μm or less, and more preferably 30 μm or greater but 120 μm or less.

In the columnar resin particles, a length of each of the columnar resin particles is preferably 20 μm or greater but 200 μm or less, and more preferably 30 μm or greater but 120 μm or less.

A ratio of a length of each of the columnar resin particles to a diameter of each of the columnar resin particles, which is determined by the length/diameter, is preferably 0.5 or greater but 2.0 or less, and more preferably 0.8 or greater but 1.5 or less.

In the columnar resin particles, a difference between the maximum diameter and the minimum diameter of the cross-section perpendicular to the axial direction of each of the columnar resin particles is preferably 30% or less, and more preferably 20% or less relative to the maximum diameter.

In the columnar resin particles, at least a portion of edges of each of the columnar resin particles does not have an apex.

Figure 10A:
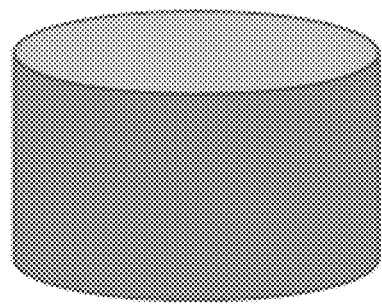
Figure 10B:
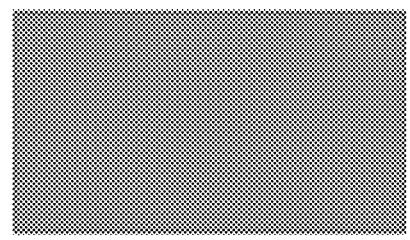
Figure 10C:
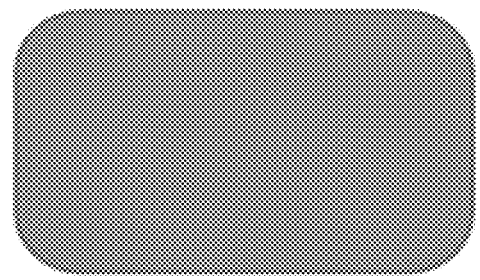
Figure 10D:
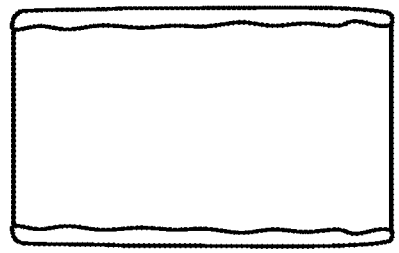
Figure 10E:
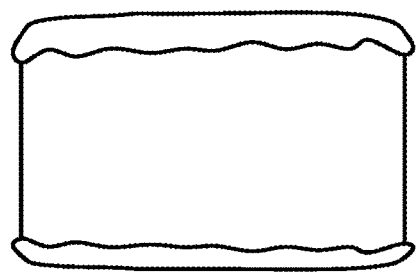
Figure 10F:
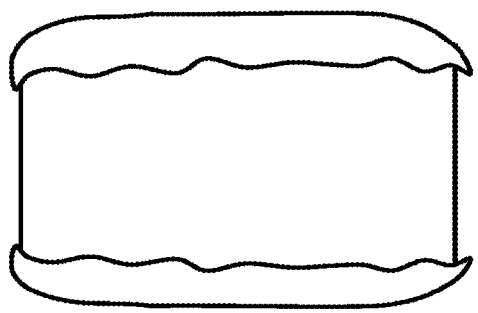
Figure 10G:
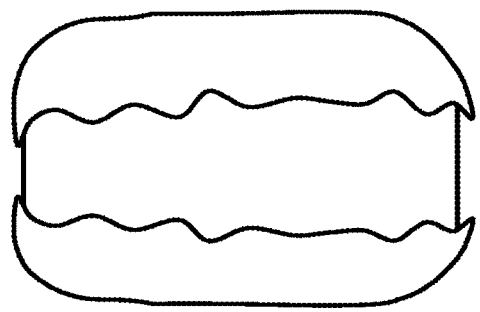
Figure 10H:
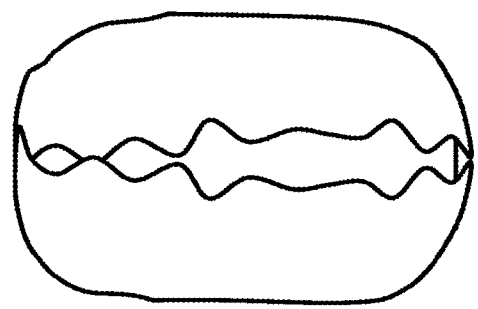
Figure 10I:
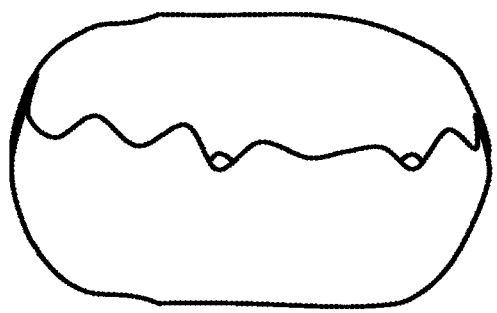

Examples of the edges of each of the columnar resin particles not having an apex include edges of a cylinder, such as curve surfaces each having a radius of curvature of 1 μm or greater but 10 μm or less as illustrated in FIGS. 10C to 10F; edges of a cylinder chamfered as illustrated in FIGS. 10G to 10I. In the cases where the edges of the cylinder are chamfered, a length of the chamfered part (X in FIG. 10H) is preferably 1 μm or greater but 20 μm or less, and more preferably 2 μm or greater but 10 μm or less. When the length of the chamfered part is within the above-mentioned preferable range, fluidity suitable for forming a three-dimensional object can be obtained, and deformation is minimized during formation of a three-dimensional object to improve dimensional accuracy of the three-dimensional object.

A ratio of columnar resin particles where filaments of the fibrous material are aligned in the axial direction of each of the columnar resin particles in the columnar resin particles is preferably 70% by number or greater, more preferably 80% by number or greater, and yet more preferably 90% by number or greater.

Note that, the ratio of the columnar resin particles where the filaments of the fibrous material are aligned in the axial direction of each of the columnar resin particles in the columnar resin particles is, for example, determined by observing 100 particles of the columnar resin particles under a scanning electron microscope (SEM), and determining the number of the columnar resin particles where filaments of the fibrous material are aligned in the axial direction of each of the columnar resin particles.

The columnar resin particles may include resin particles other than the columnar resin particles. A ratio of the

5 columnar resin particles in all of the resin particles is preferably 70% by number or greater, more preferably 80% by number or greater, and yet more preferably 90% by number or greater.

The columnar resin particles preferably include a resin, filaments of a fibrous material, and other components according to the necessity.

<Resin>

The resin is not particularly limited and may be appropriately selected depending on the intended purpose. Examples of the resin include a thermoplastic resin and a curable resin. Among them, a thermoplastic resin is preferable. The thermoplastic resin is a resin that is plasticized and melted by application of heat.

The thermoplastic resin is preferably a crystalline thermoplastic resin.

Melting Point

A melting point of the thermoplastic resin is preferably 100°C or higher, more preferably 150°C or higher, and yet more preferably 200°C or higher. The melting point of the thermoplastic resin can be measured in accordance with ISO 3146 (Plastics—A method for determination of melting point of semi-crystalline polymers, JIS K 7121).

Glass Transition Temperature

A glass transition temperature (Tg) of the thermoplastic resin is not particularly limited and may be appropriately selected depending on the intended purpose. The glass transition temperature is preferably 0°C or higher, more preferably 50°C or higher.

A maximum endothermic peak temperature of the thermoplastic resin and the glass transition temperature (Tg) thereof can be measured in accordance with ISO 3146 (Plastics—A method for determination of melting point of semi-crystalline polymers, JIS K 7121).

Examples of the thermoplastic resin include polyolefin, polyamide, polyester, polyarylketone, polyphenylene sulfide, a liquid crystal polymer (LCP), polyacetal (POM), polyimide, and a fluororesin.

Examples of the polyolefin include polyethylene and polypropylene.

Examples of the polyamide include polyamide 410 (PA410), polyamide 6 (PA6), polyamide 66 (PA66), polyamide 610 (PA610), polyamide 611 (PA611), polyamide 612 (PA612), polyamide 61 (PA61), polyamide 9T (PA9T), polyamide MXD6 (PAMXD6), and semi-aromatic polyamide. The polyamide 9T is also referred to as polynonamethylene terephthalamide and is composed of a nonane diamine and a terephthalic acid. The semi-aromatic polyamide is a polyamide where part of the main chain thereof has an aromatic ring.

Examples of the polyester include polyethylene terephthalate (PET), polybutadiene terephthalate (PBT), and polylactic acid (PLA). Polyester partially including an aromatic such as a terephthalic acid (e.g., semi-aromatic polyester), may also be used.

Examples of the polyarylketone include polyether ether ketone (PEEK), polyether ketone (PEK), polyether ketone ketone (PEKK), polyether ether ketone ketone (PEEKK), and polyether ketone ether ketone ketone (PEKEKK).

Other examples of the thermoplastic resin include polyacetal, polyimide, and polycarbonate.

A commercial product may be used as the thermoplastic resin.

Examples of the commercial product include PA9T (trade name: GENESTA, available from Kuraray Co., Ltd.), PA4T (trade name: FORTII, available from DSM), PA6T, PA66

According to a method for producing a three-dimensional object, a strength of an object along the XY direction tends to be high owing to adhesion between laminated layers, but a strength of the object along a height direction (Z direction) along which the layers are to be laminated is low. Even mixing and adding the fibrous material to the resin powder does not improve the strength along the Z direction because the directions of the fibers of the fibrous material are aligned in the XY direction.

In the case where an object is formed using a resin powder including a fibrous material, moreover, the resin powder is arranged randomly without having any regularity in a particular direction when the resin powder is laminated. Therefore, the filaments of the fibrous material are also arranged in random directions in the object. As a result of the arrangements as mentioned, the strength of the three-dimensional object as a whole can be expected. It is however difficult to provide, for example, a three-dimensional object with which a strength thereof only in a certain direction is improved.

As a result of researches conducted by the present inventors, it has been found that resin particles having the following structure are effective, for example, as resin particles including filaments of a fibrous material that can be used for increasing a strength in a certain direction.

When the resin particles are used as resin particles for forming a three-dimensional object, which are a material for producing a three-dimensional object, a strength of a three-dimensional object in a certain direction, particularly, a strength thereof in a height direction (Z direction) of formed layers constituting the three-dimensional object, can be improved.

The present disclosure has an object to provide resin particles, to which anisotropy of functions or properties has been imparted, for example, resin particles strength of which is improved in a certain direction.

The present disclosure can provide resin particles, to which anisotropy of functions or properties has been imparted, for example, resin particles strength of which is improved in a certain direction.

(Resin Particles)

The resin particles of the present disclosure include columnar resin particles each including a fibrous material.

Alignment directions of the filaments of the fibrous material in the resin particles are identical and the filaments of the fibrous material are aligned in an axial direction of each of the columnar resin particles.

Each of the resin particles includes filaments of a fibrous material and a resin, and may further include other ingredients according to the necessity.

A method for producing resin particles will be specifically described later. In the present disclosure, for example, filaments of the fibrous material are aligned in an axial direction of each of the columnar resin particles in the following manner.

A resin particle forming material where the material includes a resin and a fibrous material is stretched into fibers. As a result, the resin fibers are aligned in the stretching direction. Along with the alignment of the resin fibers, the filaments of the fibrous material in the resin are also aligned in the resin fibers. Accordingly, the filaments of the fibrous material are aligned in the axial direction of each of the columnar resin particles.

In the present specification, the axial direction of each of the columnar resin particles corresponds to a direction along which the resin has been stretched because column-shaped resin particles are formed.

The resin particles of the present disclosure, in each of which the filaments of the fibrous material are aligned in the axial direction of each of the columnar resin particles, are resin particles to which anisotropy of functions or properties is imparted owing to the above-described characteristics.

In the present specification, to have anisotropy of functions or properties means, for example, that chemical or physical characteristics are different between the Z direction and the XY direction. More specifically, to have anisotropy of functions or properties means that mechanical strength is different between the Z direction and the XY direction, or in case of a metal-based fibrous material, electric conductivity or thermal conductivity is different between the Z direction and the XY direction.

For example, the resin particles of the present disclosure can be used for the purpose of increasing strength in a certain direction utilizing the above-described characteristics.

<Applicable Fields of Resin Particles>

Applicable fields of the resin particles of the present disclosure are not particularly limited and the resin particles can be used in any field. Examples of more preferable embodiments include use of the resin particles as resin particles for forming a three-dimensional object, where the resin particles for forming a three-dimensional object are a material for producing a three-dimensional object.

In addition to the use of the resin particles of the present disclosure as resin particles for forming a three-dimensional object, for example, the resin particles of the present disclosure can be used for surface contraction agents, spacers, lubricants, paints, grind stone, additives, secondary battery cell separators, food products, cosmetic products, or clothes. Moreover, the resin particles of the present disclosure can be also used as a material or a metal substitute material used in fields of automobiles, precision equipment, semiconductors, aerospace, and medicines.

<Columnar Shape>

The columnar shape is a shape of a column.

For example, the columnar shape can be judged on resin particles in an SEM image photographed at a magnification of 150 times by SEM (scanning electron microscope JSM-7800FPRIME, available from JEOL Ltd.) in the following manner.

The columnar shape is a shape including a first surface, a second surface, and a side surface, and is a shape where an outer circumferential region of the first surface and an outer circumferential region of the second surface are both extended along the side surface.

Since shapes of the resin particles are columns, the resin particles can be packed without any gaps, for example when the resin particles of the present disclosure are used as resin particles for forming a three-dimensional object and are used for forming formed layers, and therefore a strength of an obtained three-dimensional object can be improved.

The column includes surfaces facing each other. The surfaces facing each other may be inclined. In view of productivity and stability of a resultant three-dimensional object when the resin particles are used for production of the three-dimensional object, the surfaces facing each other are preferably surfaces parallel to each other without inclination. Note that, flowability of the resin particles may be improved by performing a smoothing treatment of angular parts of columns.

Figure 9:
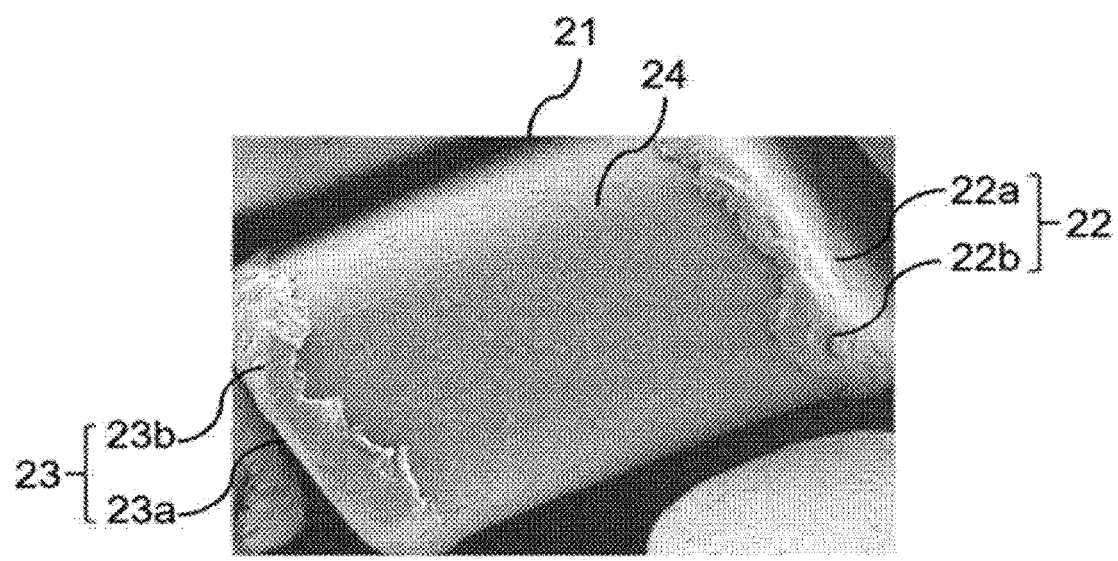

An example of the columnar shape is illustrated in FIG. 9.

FIG. 9 is a photograph depicting one example of a column. Note that, FIG. 9 is a photograph taken under a scanning electron microscope (SEM).

As illustrated in FIG. 9, a column 21 includes a first surface 22, a second surface 23, and a side surface 24. The first surface 22 includes a first counter surface 22a and an outer circumferential region 22b of the first surface where the outer circumferential region has a shape extending along the side surface 24. The outer circumferential region 22b of the first surface is a surface communicating to the first counter surface 22a via a curved surface and is approximately orthogonal to the first counter surface 22a. The second surface 23 includes a second counter surface 23a facing the first counter surface 22a and an outer circumferential region 23b of the second surface where the outer circumferential region has a shape extending along the side surface 24. The outer circumferential region 23b of the second surface is a surface communication to the second counter surface 23a via the curved surface and is approximately orthogonal to the second counter surface 23a. The side surface 24 is present next to the first surface 22 and the second surface 23. Moreover, the outer circumferential region 22b of the first surface and the outer circumferential region 23b of the second surface are extended onto the side surface 24.

Note that, a shape of the outer circumferential region 22b of the first surface (may be referred to simply as an "outer circumferential region" hereinafter) and a shape of the outer circumferential region 23b of the second surface (may be referred to simply as an "outer circumferential region" hereinafter) are here not particularly limited as long as the shapes are shapes distinguishable from the side surface 24 on an SEM image. Examples of the shapes include a shape where part of the outer circumferential region is integrated with the side surface 24, a shape where the outer circumferential region is in contact with the side surface 24, and a shape where a space is present between the outer circumferential region and the side surface 24. Moreover, the outer circumferential region 22b of the first surface and the outer circumferential region 23b of the second surface are preferably disposed in the manner that planar directions of the outer circumferential region 22b of the first surface and the outer circumferential region 23b of the second surface are identical to the planar direction of the side surface 24.

As illustrated in FIG. 9, the outer circumferential region 22b of the first surface and the outer circumferential region 23b of the second surface are extended along the side surface 24, and are positioned above the side surface 24. Moreover, the characteristic structure of the first surface and the second surface, where near a joint region between the outer circumferential region 22b of the first surface and the side surface 24 and near a joint region between the outer circumferential region 23b and the side surface 24 are covered, is also called a bottle-cap shape.

Moreover, a resin powder of appropriate cylinders, for example, has column shapes each having a bottom surface and a top surface, but the column shapes preferably do not have apexes in order to increase the bulk density. The apex is an angular part present in the column.

Shapes of the columnar particles are described with reference to FIGS. 10A to 10I. FIG. 10A is a schematic perspective view illustrating one example of a cylinder. FIG. 10B is a side view of the cylinder of FIG. 10A. FIG. 10C is a side view illustrating one example of a cylinder that does not have an apex at an edge thereof. FIGS. 10D to 10I are each a side view illustrating another example of a shape of a cylinder that does not have an apex at an edge thereof.

When the cylinder illustrated in FIG. 10A is observed from the side, the cylinder has a rectangular shape as illustrated in FIG. 10B and has 4 angular parts, i.e., 4 apexes. Examples of a shape of the cylinder that does not have an apex at an edge thereof are FIGS. 10C to 10I. The presence of the apexes of the columnar particles can be confirmed by judging from projected images of sides of the columnar particles. For example, sides of the columnar particles are observed by means of a scanning electron microscope (device name: S4200, available from Hitachi, Ltd.) to obtain a two-dimensional image. In this case, a projected image is a quadrilateral. When each site formed by two sides next to each other is determined as an edge part, the quadrilateral has apexes as angles are formed in the case where the edge part is formed with only two straight lines. In the case where the edge parts are formed with arcs as illustrated in FIGS. 10C to 10I, the quadrilateral does not have apexes at edges thereof.

In the present disclosure, a surface of a columnar resin particle formed in the direction vertical to the axial direction of the columnar resin particle is determined as a bottom surface of the columnar resin particle. Moreover, a distance between the bottom surface and a surface of the columnar resin particle facing the bottom surface is determined as a height of the columnar resin particle. In the present specification, the bottom surface does not need to be strictly vertical as long as the bottom surface is formed appropriately vertical to the axial direction of the columnar resin particle. For example, the appropriately vertical means in the region of about 90°35 30°.

A shape of the bottom surface is not particularly limited. Examples of the shape thereof include an approximate circle and approximate polygon as described later. Moreover, the approximate circle may be an approximate true circle or an approximate oval.

In the present disclosure, a straight line corresponding to a diameter of a major axis of the bottom surface is called the maximum diameter. For example, a diameter in the approximate true circle, a major axis of the approximate oval, and a long side of the approximate square are called the maximum diameters.

Whether a shape of the resin particle is a columnar shape or not can be determined, for example, by observing resin particles in an SEM image photographed with the magnification of 150 times using SEM (scanning electron microscope JSM-7800FPRIME, available from JEOL Ltd.).

Note that, the magnification of the SEM (scanning electron microscope) can be appropriately changed depending on the size of the resin particles.

For example, the maximum diameter or height of the columnar resin particles can be determined as an average value when 100 particles are observed.

—Approximate Column Shape—

A shape of the column is not particularly limited and may be appropriately selected depending on the intended purpose. Examples of the shape include an approximate cylinder and an approximate prism. In the case where the resin particles of the present disclosure are used as resin particles for forming a three-dimensional object, for example, the shape is preferably an approximate cylinder or an approximate prism, because strength of a three-dimensional object is high as the packing density of the powder is high when the resin particles for forming a three-dimensional object is formed into a film. A particular case where a shape of each of the resin particles is an approximate cylindrical shape or an approximate prism shape will be described below.

A shape of the approximate cylinder is not particularly limited and may be appropriately selected depending on the intended purpose. Examples of the shape include an approximate true cylinder where shapes of a first counter surface and a second counter surface are approximate true circles and an approximate elliptic cylinder where shapes of a first counter surface and a second counter surface are approximate true ovals. Among the above-listed examples, an approximate true cylinder is preferable. Note that, part of a circular part of the approximate cylinder may be missing. Moreover, an approximate circle means a circle having a ratio (major axis/minor axis) of 1 or greater but 10 or less, where the ratio is a ratio of a major axis to a minor axis.

An area of the first counter surface and an area of the second counter surface may be slightly different. A ratio (large surface/small surface) of a diameter of a larger surface to a diameter of a small surface is preferably 1.5 times or less, and more preferably 1.1 times or less because the density of a resulting powder can be increased as compacted when shapes are unified.

A diameter of the approximate cylinder is not particularly limited and may be appropriately selected depending on the intended purpose. The diameter is preferably 5 μm or greater but 500 μm or less. In the case where a circular part of the approximate cylinder is an approximate oval, a diameter means a major axis.

A height of the approximate cylinder is not particularly limited and may be appropriately selected depending on the intended purpose. The height is preferably 5 μm or greater but 500 μm or less.

A length of a long side of the bottom surface of the approximate prism is not particularly limited and may be appropriately selected depending on the intended purpose. The length is preferably 5 μm or greater but 500 μm or less.

A height of the approximate prism is not particularly limited and may be appropriately selected depending on the intended purpose. The height is preferably 5 μm or greater but 500 μm or less.

A state of a column where a side for forming a distance (height) between the bottom surface and the surface facing the bottom surface is smashed (in case of a cylinder, for example, a barrel shape) is also included in a scope of the present disclosure. However, preferable is a shape of a column where a side is a straight line because a powder cannot be densely compacted whereas a powder in the shape of columns having arced sides leaves gaps between the columns as compacted.

<Resin Component of Resin Particles>

A resin component of the resin particles is not particularly limited and may be appropriately selected depending on the intended purpose. In the case where the resin particles of the present disclosure are used as resin particles for forming a three-dimensional object, for example, a thermoplastic resin may be used as a resin of the resin particles for forming a three-dimensional object.

The thermoplastic resin is a resin that is plasticized and melted when the resin is heated. Among the thermoplastic resins, a crystalline resin may be used. The crystalline resin is a resin having a melting peak when the resin is subjected to a measurement of ISO 3146 (measuring method of plastic transition temperature, JIS K7121).

As the crystalline resin, a crystalline thermoplastic resin whose crystallinity is controlled is preferable, and a crystalline thermoplastic resin whose size of crystals or alignment of crystals is controlled by a heat treatment, stretching, a crystal nucleating agent, or a method of external additive, such as an ultrasonic wave treatment, is more preferable.

A production method of the crystalline thermoplastic resin is not particularly limited and may be appropriately selected depending on the intended purpose. Examples of the production method include: an annealing treatment where heating is performed at a temperature equal to or higher than a glass transition temperature of the resin to increase crystallinity; and a method where, after the annealing, a crystal nucleating agent is added to increase crystallinity and an annealing treatment is performed to further increase crystallinity. Other examples include: a method where ultrasonic waves are applied to increase crystallinity; and a method where the resin is dissolved slowly in a solvent to increase crystallinity. Furthermore, other examples include a method where a highly aligned and highly crystallized resin formed through growth of crystal by externally applying electric field, or through stretching is pulverized or cut.

The annealing can be performed by heating the resin at a temperature higher than a glass transition temperature of the resin by 50° C. for 3 days, followed by slowly cooling to a room temperature.

As the stretching, the resin solution is stretched into fibers by means of an extrusion cutting device with stirring at a temperature higher than a melting point by 30° C. or greater. At the time of stretching, the solution is stretched into fibers in about 1-fold or greater but about 10-fold or less. The maximum stretching ratio can be changed depending on melt viscosity of the resin.

The application of ultrasonic waves can be performed by adding a glycerin (available from Tokyo Chemical Industry Co., Ltd., reagent grade) solvent to the resin in about 5-fold, heating the resultant to a temperature higher than a melting point of the resin by 20° C., and applying ultrasonic waves at 24 kHz and amplitude of 60% for 2 hours by means of an ultrasonic wave generator (ultrasonicator UP200S, available from Hielscher Ultrasonics GmbH). Thereafter, it is preferable that washing be performed with a solvent of isopropanol at room temperature, and the resultant be vacuum dried.

The external application of an electric field can be performed by heating the resin at a temperature equal to or higher than a glass transition temperature, then applying alternating electric field (500 Hz) of 600 V/cm for 1 hour, followed by slowly cooling.

When the resin particles are used as resin particles for forming a three-dimensional object, a large temperature width (temperature window) of a crystal phase change is preferable, for example, in the PBF system, because splash back can be prevented at the time of production of a three-dimensional object. In view of the crystal phase change, the resin powder having the larger difference between a melt onset temperature and a recrystallization point at the time of cooling is more preferable because formability is improved.

<<Resin of Resin Particles>>

As described above, a resin for constituting the resin particles is not particularly limited. When the resin particles are used as resin particles for forming a three-dimensional object, for example, a crystalline resin is preferably used among thermoplastic resins.

Examples of the crystalline resin include polymers, such as polyolefin, polyamide, polyester, polyether, polyphenylene sulfide, a liquid crystal polymer (LCP), polyacetal (POM, melting point: 175° C.), polyimide, and a fluororesin.

The above-listed examples may be used alone or in combination.

In addition to the polymers above, the thermoplastic resin may further include a flame retardant, a plasticizer, additives (e.g., thermal stabilizer additives and a crystal nucleating agent), and polymer particles of an amorphous resin etc. The above-listed examples may be used alone or in combination.

Examples of the polyolefin include polyethylene, ultra high molecular weight polyethylene, and polypropylene (PP, melting point: 180° C.).

Examples of the polyamide include polyamide 410 (PA410), polyamide 6 (PA6), polyamide 66 (PA66, melting point: 265° C.), polyamide 610 (PA610), polyamide 612 (PA612), polyamide 11 (PA11), polyamide 12 (PA12); semi-aromatic polyamide 4T (PA4T), polyamide MXD6 (PAMXD6), polyamide 6T (PA6T), polyamide 9T (PA9T, melting point: 300° C.), and polyamide 10T (PA10T). Among the above-listed examples, PA9T is called polynonamethylene terephthalamide and is called semi-aromatic because PA9T is made up of diamine having 9 carbon atoms and a terephthalic acid monomer and the side of the carboxylic acid is generally aromatic. As wholly aromatic polyamide in which the side of diamine is also aromatic, moreover, so-called aramid formed of p-phenylenediamine and terephthalic acid monomer is also included in the polyamide of the present disclosure.

Examples of the polyester include polyethylene terephthalate (PET, melting point: 260° C.), polybutylene terephthalate (PBT, melting point: 218° C.), and polylactic acid (PLA). In order to impart heat resistance, polyester including an aromatic ring to which terephthalic acid or isophthalic acid are partially added may be suitably used in the present disclosure.

Examples of the polyether include polyether ether ketone (PEEK, melting point: 343° C.), polyether ketone (PEK), polyether ketone ketone (PEKK), polyaryl ether ketone (PAEK), polyether ether ketone ketone (PEEKK), and polyether ketone ether ketone ketone (PEKEKK). The resin may be any resin other than the above-mentioned polyether, as long as the resin is a crystalline polymer. Examples of such resins include polyacetal, polyimide, and polyether sulfone. A resin having two melting points, such as PA9T, may be used as the resin.

<Fibrous Material>

Examples of the fibrous material include cellulose-based fibers, protein-based fibers, mineral-based fibers, metal-based fibers, carbon-based fibers, silicate-based fibers, and polymer-based fibers.

<Other Ingredients>

Moreover, the columnar resin particles may include an arbitrary superplasticizer, a particle size controlling agent, a reinforcing agent, and an antioxidant. An amount of the superplasticizer is not limited as long as the amount thereof is an amount sufficient to cover surfaces of the resin particles. For example, the amount thereof is preferably 0.1% by mass or greater but 10% by mass or less. As the superplasticizer, a particulate inorganic material having a volume average particle diameter of less than 10 μm is suitably used.

<Preferable Embodiment of Columnar Resin Particles>

Examples of a preferable embodiment of the resin particles of the present disclosure include first resin particles below and second resin particles below.

In the present disclosure, when a surface of the columnar resin particle formed vertical to the axial direction is determined as a bottom surface of the columnar resin particle and a distance between the bottom surface and a surface of the columnar resin particle facing the bottom surface is determined as a height of the columnar resin particle, the first resin particles are columnar resin particles, in which a maximum diameter of the bottom surface of each of the columnar resin particles is greater than the height of each of the columnar resin particles.

Examples of a preferable embodiment of the first resin particles include resin particles having a ratio (height/maximum diameter) of 0.05 times or greater but 0.7 times or less, where the ratio is a ratio of the height to the maximum diameter.

In the present specification, the second resin particles are columnar resin particles, in which the height of each of the columnar resin particles is greater than a maximum diameter of the bottom surface of each of the columnar resin particles Examples of a preferable embodiment of the second resin particles include resin particles having a ratio (height/maximum diameter) of 1.1 time or greater but 15 times or less, where the ratio is a ratio of the height to the maximum diameter.

<Application to Production of Three-Dimensional Object: Use as Resin Particles for Forming a Three-Dimensional Object>

The resin particles of the present disclosure are preferably resin particles for forming a three-dimensional object, where the resin particles for forming a three-dimensional object are a material for producing a three-dimensional object.

As the resin particles for forming a three-dimensional object, the above-described first resin particles or second resin particles are preferably used.

As a preferable embodiment of the resin particles for forming a three-dimensional object of the present disclosure, the resin particles for forming a three-dimensional object include a first resin particle group including the above-described first resin particles and a second resin particle group including the above-described second resin particles.

A storage method or usage method of the resin particles for forming a three-dimensional object of the present disclosure is not limited as long as the resin particles for forming a three-dimensional object include the first resin particle group and the second resin particle group. For example, resin particles for forming a three-dimensional object made up of the first resin particle group and resin particles for forming a three-dimensional object made up of the second resin particle group may be stored without mixing the first resin particle group and the second resin particle group, and may be used separately. Alternatively, the first resin particle group and the second resin particle group may be mixed together and used as an embodiment of resin particles for forming a three-dimensional object where both the first resin particle group and the second resin particle group are mixed together.

<<First Resin Particle Group and Second Resin Particle Group>>

The resin particles for forming a three-dimensional object of the present disclosure preferably include the first resin particle group and the second resin particle group.

The first resin particle group is a group of resin particles where the maximum diameter of the bottom surface of the resin particle is greater than the height of the resin particle. The second resin particle group is a group of resin particles where the height of the resin particle is greater than the maximum diameter of the bottom surface of the resin particle.

The resin particle belonging to the first resin particle group where the maximum diameter of the bottom surface of the resin particle is greater than the height of the resin particle is, for example, illustrated as a schematic view in FIG. 1. As illustrated in FIG. 1, the resin particle belonging to the first resin particle group is present with the bottom surface of the column facing down due to the low of gravity, and therefore the filaments of the fibrous material are aligned in the height direction (Z direction). In the case where a three-dimensional object is formed by laminating cured layers each formed by forming the columnar resin particles into films, the filaments of the fibrous material are aligned in the height direction (Z direction) along which the cured layers are to be laminated. Owing to the above-mentioned alignment, the strength along the height direction (Z direction) of the formed layer constituting a three-dimensional object can be improved.

Figure 2:
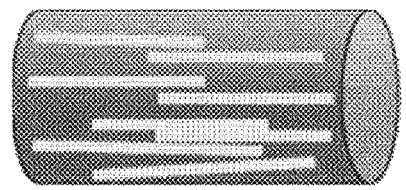

The second resin particle belonging to the second resin particle group where the height of the resin particle is greater than the maximum diameter of the bottom surface of the resin particle is, for example, illustrated as a schematic view in FIG. 2. As illustrated in FIG. 2, the column of the resin particle belonging to the second resin particle group falls sideway due to the law of gravity to make the side surface of the column face down and therefore the filaments of the fibrous material are aligned in the direction (XY direction) parallel to the bottom surface. In the case where a three-dimensional object is formed by laminating cured layers formed by forming the columnar resin particles into films, therefore, the fibrous material is aligned in the direction (XY direction) parallel to the surface on which the cured layers are to be laminated. Owing to the above-mentioned alignment, the strength along the direction (XY direction) parallel to the laminate surface of the formed layer constituting a three-dimensional object can be improved.

The resin particles of the first resin particle group are preferably resin particles having a ratio (height/maximum diameter) of 0.05 times or greater but 0.7 times or less, where the ratio is a ratio of the height to the maximum diameter.

When the ratio is 0.7 times or less, a distinct difference can be achieved when the fibrous material is to be aligned in the height direction (Z direction) to be laminated compared with the case where the fibrous material is aligned in the direction (XY direction) parallel to a surface on which layers are to be laminated.

The resin particles of the second resin particle group are preferably resin particles having a ratio (height/maximum diameter) of 1.1 times or greater but 15 times or less, where the ratio is a ratio of the height to the maximum diameter.

When the ratio is 1.1 times or greater, a distinct difference can be achieved when the fibrous material is to be aligned in the direction (XY direction) parallel to a surface on which layers are to be laminated compared to the case where the fibrous material is aligned in the height direction (Z direction) to be laminated.

The maximum diameter and height of the columnar resin particle can be determined in the following manner.

For example, the maximum diameter and the height are measured by observing the resin particles for forming a three-dimensional object in an SEM image photographed at a magnification of 150 times by an SEM (scanning electron microscope JSM-7800FPRIME, available from JEOL Ltd.).

The maximum diameter and height are determined as an average value of the measurement results of 100 columnar resin particles.

As described above, a storage method or usage method of the resin particles for forming a three-dimensional object of the present disclosure is not limited as long as the resin particles for forming a three-dimensional object include the first resin particle group and the second resin particle group. For example, resin particles for forming a three-dimensional object made up of the first resin group and resin particles for forming a three-dimensional object made up of the second resin group may be stored without mixing the first resin particle group and the second resin particle group, and may be used separately.

Figure 3:
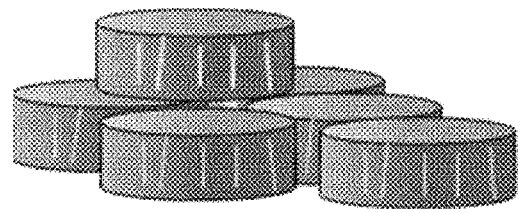

As illustrated in FIG. 3, the alignment directions of the filaments of the fibrous material in the resin particles belonging to the first resin particle group are aligned in the height direction (Z direction) to be laminated when cured layers are laminated.

Figure 4:
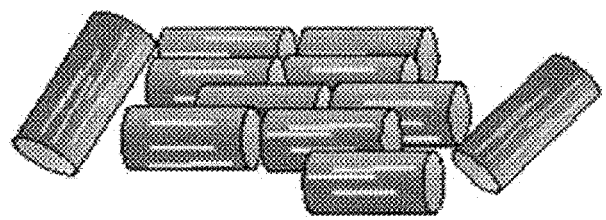

As illustrated in FIG. 4, the alignment directions of the filaments of the fibrous material in the resin particles belonging to the second resin particle group are aligned in the direction (XY direction) parallel to a laminate surface when cured layers are laminated.

Moreover, the resin particles for forming a three-dimensional object of the present disclosure may be used as an embodiment of resin particles for forming a three-dimensional object in which the first resin particle group and the second resin particle group are mixed.

Figure 5:
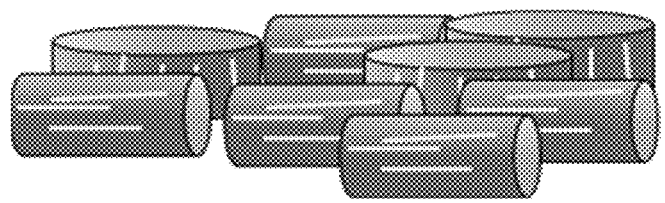

As illustrated in FIG. 5, the fibrous material in the resin particles for forming a three-dimensional object, in which the first resin particle group and the second resin particle group are mixed, is aligned in either the Z direction or the XY direction.

In this case, the strength along the height direction (Z direction) of a formed layer constituting a three-dimensional object, or the strength along the direction (XY direction) parallel to a laminate surface of a formed layer can be appropriately adjusted by varying a blending ratio between the first resin particle group and the second resin particle group.

In the case where improvement of the strength along the height direction (Z direction) of a formed layer is desired, an amount of the first resin particle group can be increased and the amount of the second resin particle group is controlled to, for example, 10% by mass or less, preferably 5% by mass or less relative to the first resin particle group.

When forming is performed using a large amount of the first resin particle group where the fibrous material is aligned in the Z direction, an obtained three-dimensional object has high strength in the height direction (Z direction) of a formed layer.

In the case where strength along the direction (XY direction) parallel to a laminate surface of formed layers, an amount of the second resin particles can be increased and the amount of the first particle group is controlled to, for example, 10% by mass or less, preferably 5% by mass or less relative to the second resin particle group. When forming is performed using a large amount of the second resin particle group where the filaments of the fibrous material are aligned in the XY direction, an obtained three-dimensional object has high strength in the direction (XY direction) parallel to a laminate surface of a formed layer.

<<Ratio of Columnar Resin Particles>>

The resin particles for forming a three-dimensional object of the present disclosure are not particularly limited as long as the resin particles for forming a three-dimensional object includes the above-mentioned columnar resin particles including the fibrous material (first resin particles and second resin particles). The resin particles for forming a three-dimensional object may further include columnar resin particles free from a fibrous material or irregular-shaped resin particles, such as non-columnar resin particles.

An amount (number base) of the columnar resin particles including the fibrous material contained in the resin particles for forming a three-dimensional object is preferably 50% by mass or greater and more preferably 70% by mass or greater relative to the resin particles for forming a three-dimensional object.

A specific calculation method of the amount of the columnar resin particles is performed in the following manner.

The number of the resin particles for forming a three-dimensional object and the number of the columnar resin particles are determined from an image photographed at a magnification of 150 times by a scanning electron microscope (SEM), and the number of the column resin particles is divided by the number of the resin particles for forming a three-dimensional object and the resultant value is multiplied with 100 to obtain the amount of the columnar resin particles.

Note that, the magnification of the scanning electron microscope (SEM) can be appropriately changed depending on the size of the resin particles for forming a three-dimensional object. When the number of the resin particles for forming a three-dimensional object and the number of the columnar resin particles are determined from the SEM image, in the present disclosure, the target for counting is only the resin particles for forming a three-dimensional object and the columnar resin particles each having the longest part being 5 μm or greater. At the time when the amount of the columnar resin particles is calculated, moreover, the number of the resin particles for forming a three-dimensional object is 100 or more.

<<Physical Properties of Resin Particles for Forming a Three-Dimensional Object>>

The resin particles for forming a three-dimensional object of the present disclosure preferably satisfy at least one selected from the group consisting of (1) to (3) below.

(1) Tmf1>Tmf2, when Tmf1 is a melting onset temperature of an endothermic peak obtained by heating up to a temperature higher than a melting point by 30° C. at 10° C./min according to ISO 3146 in differential scanning calorimetry, and Tmf2 is a melt onset temperature of an endothermic peak obtained by, after the above-mentioned heating, cooling to −30° C. or lower at 10° C./min and then further heating to a temperature higher than the melting point by 30° C. at 10° C./min according to ISO 3146 in differential scanning calorimetry. Note that, the melting onset temperature of the endothermic peak is a temperature of the point that is −15 mW below from a straight line parallel to the x axis. The straight line is drawn from a predetermined point to the side of the lower temperature. The predetermined point is a point at which a calorific value becomes constant after completing endotherm at the melting point.

(2) Cd1>Cd2, when Cd1 is a crystallization degree determined from an energy amount of an endothermic peak obtained by heating to a temperature higher than a melting point of the resin by 30° C. at 10° C./min according to ISO 3146 in differential scanning calorimetry, and Cd2 is a crystallization degree determined from an energy amount of an endothermic peak obtained by, after the heating, cooling to a temperature of −30° C. or lower at 10° C./min and then again heating to a temperature higher than the melting point by 30° C. at 10° C./min according to ISO 3146 in differential scanning calorimetry.

(3) Cx1>Cx2, when Cx1 is a crystallization degree obtained by X ray diffraction spectroscopy, and Cx2 is a crystallization degree obtained through X-ray diffraction spectroscopy performed after heating to a temperature higher than a melting point by 30° C. at 10° C./min in a nitrogen atmosphere, cooling to −30° C. or lower at 10° C./min, and then heating to a temperature higher than the melting point by 30° C. at 10° C./min.

The parameters of (1) to (3) above are to define properties of the same resin particles for forming a three-dimensional object from different viewpoints and the parameters of (1) to (3) above are related with each other.

[Measuring Method of Melting Onset Temperature in Differential Scanning Calorimetry of Conditions (1)]

A measuring method of a melting onset temperature in differential scanning calorimetry (DSC) of the condition (1) is as described below. According to a measuring method of ISO 3146 (plastic transition temperature measuring method, JIS K7121), a melting onset temperature (Tmf1) of an endothermic peak obtained by heating to a temperature higher than a melting point by 30° C. at 10° C./min is measured by means of a differential scanning calorimeter (e.g., DSC-60A, available from Shimadzu Corporation). Thereafter, a melting onset temperature (Tmf2) of an endothermic peak is measured. The endothermic peak is obtained by, after the above-described heating, cooling to −30° C. or lower at 10° C./min and then heating to a temperature higher than the melting point by 30° C. at 10° C./min. Note that, the melting onset temperature of the endothermic peak is a temperature of the point that is −15 mW below from a straight line parallel to the x axis. The straight line is drawn from a predetermined point to the side of the lower temperature. The predetermined point is a point at which a calorific value becomes constant after completing endotherm at the melting point.

[Measuring Method of Crystallization Degree of Differential Scanning Calorimetry of Condition (2)]

A measuring method of a crystallization degree in differential scanning calorimetry of the condition (2) is as described below. An energy amount (calorific value of fusion) of an endothermic peak obtained by heating to a temperature higher than a melting point by 30° C. at 10° C./min is measured according to ISO 3146 (plastic transition temperature measuring method, JISK7121), and a crystallization degree (Cd1) can be determined from the calorific value of fusion relative to a calorific value of a perfect crystal. Thereafter, an energy value of an endothermic peak obtained by, after the above-described heating, cooling to −30° C. at 10° C./min, and then heating to a temperature higher than the melting point by 30° C. at 10° C./min is measured, and a crystallization degree (Cd2) can be determined from the calorific value of fusion relative to a calorific value of a perfect crystal.

[Measuring Method of Crystallization Degree by X-Ray Diffraction Spectrometer of Condition (3)]

A measuring method of a crystallization degree by an X-ray diffraction spectrometer of the condition (3) is as described below. A crystallization degree (Cx1) can be measured at room temperature by placing the obtained powder on a glass plate and setting a range of 2θ to from 10 through 40 by means of an X ray diffraction spectrometer including a two-dimensional detector (e.g., Discover8, available from Bruker). Next, within DSC, the sample is heated to a temperature higher than the melting point by 30° C. at 10° C./min in a nitrogen atmosphere and the temperature is maintained for 10 minutes. The sample is cooled to −30° C. at 10° C./min, followed by returning the temperature of the sample to room temperature. Then, a crystallization degree (Cx2) can be measured in the same manner as in Cx1.

<<Use of Resin Particles for Forming a Three-Dimensional Object>>

The resin particles for forming a three-dimensional object of the present disclosure have desirably balanced parameters, such as a particle size, a particle size distribution, heat transfer characteristics, melt viscosity, bulk density, flowability, a melting temperature, and a recrystallization temperature. Accordingly, the resin particles for forming a three-dimensional object can be suitably used various three-dimensional forming methods using resin powders, such as an SLS method, an SMS method, a HSS method, a multi jet fusion (MJF) method, and a BJ method.

<Method for Producing Resin Particles>

A method for producing resin particles of the present disclosure include a stretching step and a resin particle-forming step.

Moreover, the resin particle-forming step more preferably includes at least one of a first resin particle-producing step and a second resin particle-producing step.

The stretching step is a step including stretching a resin particle forming material including a resin and filaments of a fibrous material into fibers.

The resin particle-forming step is a step including cutting the fibrous resin particle forming material obtained by the stretching to form columnar resin particles, to thereby form the columnar resin particles in which the filaments of the fibrous material are aligned in the axial direction of each columnar resin particle.

The first resin particle-producing step is a step including adjusting a cutting width in the resin particle-forming step to thereby produce first resin particles in each of which a maximum diameter of a bottom surface of the columnar resin particle is greater than a height of the columnar resin particle.

The second resin particle-producing step is a step including adjusting a cutting width in the resin particle-forming step to thereby produce second resin particles in each of which a height of the columnar resin particle is greater than a maximum diameter of a bottom surface of the columnar resin particle.

The method for producing resin particles will be more specifically described hereinafter.

In the stretching step, a resin solution formed of a resin particle forming material including a resin and a fibrous material is stretched. Along the stretched resin fibers, the fibrous material in the resin is also aligned in the same direction. In this manner, the fibrous resin particle forming material is obtained by stretching.

Figure 6:

A state where the alignment direction of the fibrous material is aligned in the identical direction by stretching the resin including the fibrous material is illustrated in FIG. 6.

Next, the formed fibrous resin particle forming material is cut to obtain columnar resin particles. At the time of the cutting, cutting is performed with varying a cutting width. As a result, at least two resin particle groups (a first resin particle group made up of first resin particles and a second resin particle group made up of second resin particles) having mutually different ratios (height/maximum diameter) of a height of the columnar resin particles to the maximum diameter of the columnar resin particles are obtained.

Figure 7:
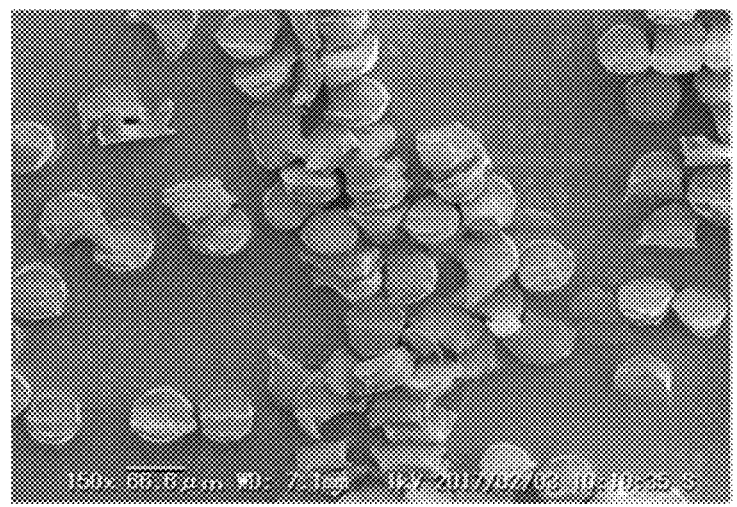
Figure 8:
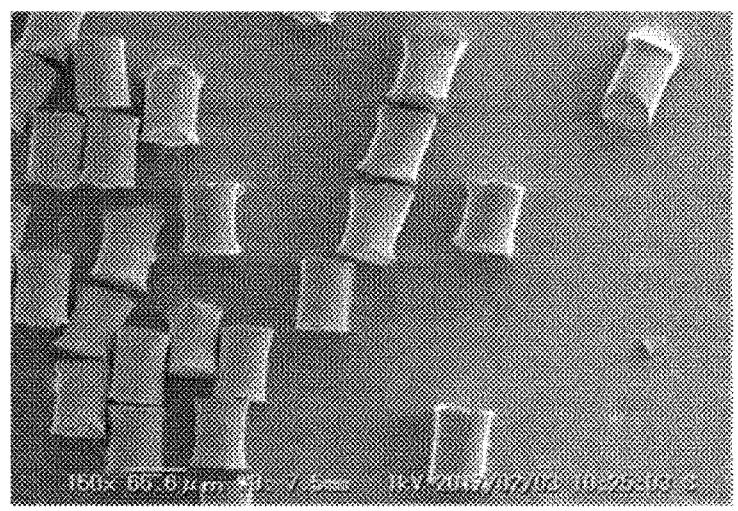

A photograph of the columnar resin particles belonging to the first resin particle group, where the columnar resin particles are produced by setting the cut length short, is depicted in FIG. 7. Moreover, a photograph of the columnar resin particles belonging to the second resin particle group, where the columnar resin particles are produced by setting the cut length long, is depicted in FIG. 8.

In the cutting step, a plurality of the formed fibrous resin particle forming materials are integrated into one bundle, and the bundled resin particle forming materials may be cut. In order to perform cutting stably, it is preferable that several fibrous resin particle forming materials be integrated together and cut in the integrated state.

In the stretching step, the resin solution is preferably stretched into fibers, for example, by means of an extrusion processing machine, with dry mixing the resin and the fibrous material in advance and stirring at a temperature higher than a melting point of the resin by 30° C. or greater. The resin solution is preferably stretched in 1-fold or greater but 10-fold or less into fibers, more preferably stretched in 2-fold or greater but 6 folds or less into fibers. When the stretching rate is low, it may be difficult to align the direction of the fibrous material. When the stretching rate is too high, the resin fibers may break during stretching. Cross-sectional shapes of the fibers can be determined by a shape of an opening of a nozzle of the extrusion processing machine. In the case a cross-section of a fiber is to be a circular shape, for example, a nozzle opening preferably also has a circular shape. As a result of the stretching step, the direction of the fibrous material in the resin particles is aligned and the crystallinity of the resin can be controlled.

When the fibrous resin particles forming materials are integrated together and cut in the resin particle-forming step, for example, cutting is performed in the following manner.

A plurality of the fibrous resin particle forming materials are aligned and arranged in the same direction and are integrated together. Examples of a method for integration include: a method where the fibrous resin particle forming materials are pressed with heating to thereby integrate together into a sheet; and a method where water is applied to the fibers to cool and the fibers are fixed in ice to integrate together. Among the above-listed examples, the method where the fibrous resin particle forming materials are pressed with heating to thereby integrate together into a sheet is preferable. As a result of the integration step as mentioned, the fibrous resin particle forming material can be fixed. In the case where the fibrous resin particle forming materials are integrated in the form of a sheet by pressing with heating, heat to be applied is different depending on a resin for use. The heat to be applied is preferably lower than a melting point of the resin, and is preferably a temperature equal to or higher than a temperature lower than the melting point by 100° C. Moreover, the pressure to be applied is preferably 10 MPa or lower. Note that, the heat and the pressure are each within a range by which the integrated fibers are separated into each fiber after going through the following cutting step. Moreover, "pressing with heating" is preferably that a step of heating is performed at the same time as a step of pressing, but may be a case where a step of heating and a step of pressing may not be performed at the same time, such as a case where after performing a step of heating, a step of pressing is performed later in the state where preheat is still remained. Moreover, a shape of the integrated fibrous resin particle forming material is not limited to a sheet, and is not particularly limited as long as the shape is a shape with which the following cutting step is appropriately performed. Moreover, the direction along which a plurality of the fibrous resin particle forming materials are aligned is not completely the identical direction, as long as the fibrous resin particle materials are aligned in an approximately same direction.

In the case where a cross-sectional shape of the fibrous resin particle forming material obtained by the stretching step is circle, the cross-sectional shape of the fibrous resin particle forming material may be partially or entirely deformed to be polygon by pressing with heating in the step of integration. As a result, the integrated fibrous resin particle forming materials each having a polygonal cross-section can be obtained.

The cutting step preferably includes continuously cutting the integrated fibrous resin particle forming materials produced in the integration step to thereby produce columnar resin particles that are a cut product. As a system for cutting, a guillotine system where a cutting device in which both an upper blade and a bottom blade are knives is used, a press cut system where a cutting device configured to cut using a plate disposed at the bottom side and an upper blade is used, or a cutting device configured to cut using $CO_2$ laser can be used. By means of any of the above-listed cutting devices, the integrated fibrous resin particle forming materials are cut to give a cut surface vertical to the alignment direction of the fibrous material. Note that, a cutting width of the cutting device is preferably 5.0 µm or greater but 300.0 µm or less. However, a narrow cutting width is not preferable because productivity is decreased and a fiber length of the fibrous material included in the resin particles becomes short, which does not contribute to an improvement of strength along the Z direction. Moreover, the cutting speed of the cutting device is not particularly limited. The cutting speed is preferably 10 spm (shots per minute) or greater but 1,000 spm or less.

In the cutting step, the fibrous resin particle forming materials are bundled in the integration step and cutting is performed in the state where the position and direction of the fibrous material is fixed. Therefore, the cutting width and cutting direction of the resin particles can be made uniform. As a result, homogeneous columnar resin particles can be obtained. If the integration step is not included at the time of cutting, for example, cutting is performed by fixing a fibrous resin particle forming material with a movable clamp and moving the fibrous resin particle forming material towards a cutting unit as in the conventional manner. When columnar resin particles are formed in the above-mentioned manner, the fibrous resin particle forming material is not sufficiently fixed and therefore a cutting width and cutting direction of the columnar resin particles may vary. Since the cutting width and cutting direction vary, columnar resin particles varying in the size or shape may be formed. Moreover, there is a possibility that columnar resin particles having unexpected shapes, such as a shape obtained by cutting a cylindrical resin in a diagonal direction, may be formed. Therefore, it is preferable at the time of cutting that the fibrous resin particle forming materials are integrated, and then cut.

Note that, the cutting direction is preferably less variable, and the cutting angle is preferably 70° or greater.

(Apparatus and Method for Producing Three-Dimensional Object)

Specific embodiments for using the resin particles of the present disclosure as resin particles for forming a three-dimensional object will be described hereinafter.

An apparatus for producing a three-dimensional object of the present disclosure is a device configured to use the above-described resin particles for forming a three-dimensional object of the present disclosure and laminate cured layers of the resin particles for forming a three-dimensional object to form a three-dimensional object.

A method for producing a three-dimensional object of the present disclosure is a method including using the above-described resin particles for forming a three-dimensional object of the present disclosure and laminating cured layers of the resin particles for forming a three-dimensional object to form a three-dimensional object.

The apparatus for producing a three-dimensional object of the present disclosure includes a supply tank configured to store the above-described resin particles for forming a three-dimensional object of the present disclosure, and a supply unit of resin particles for forming a three-dimensional object where the supplying unit is configured to supply the resin particles for forming a three-dimensional object from the supply tank.

Since the apparatus for producing a three-dimensional object of the present disclosure is synonymous to carry out the method for producing a three-dimensional object of the present disclosure, the details of the production method of the present disclosure will be made clear through descriptions of the production apparatus of the present disclosure.

For example, the apparatus for producing a three-dimensional object of the present disclosure includes, as a unit for forming a three-dimensional object, a layer forming unit configured to form a layer including the resin particles for forming a three-dimensional object, and a melting unit configured to irradiate the layer with electromagnetic waves to melt the layer. The apparatus for producing a three-dimensional object of the present disclosure may further include other units according to the necessity.

Examples of the layer forming unit include a roller, a blade, a brush, and a combination of any of the above-listed units.

Examples of an electromagnetic wave source serving as the melting unit include a $CO_2$ laser, an infrared ray source, a microwave generator, a radiation heater, a LED lamp, and a combination of any of the above-listed units.

Figure 11:
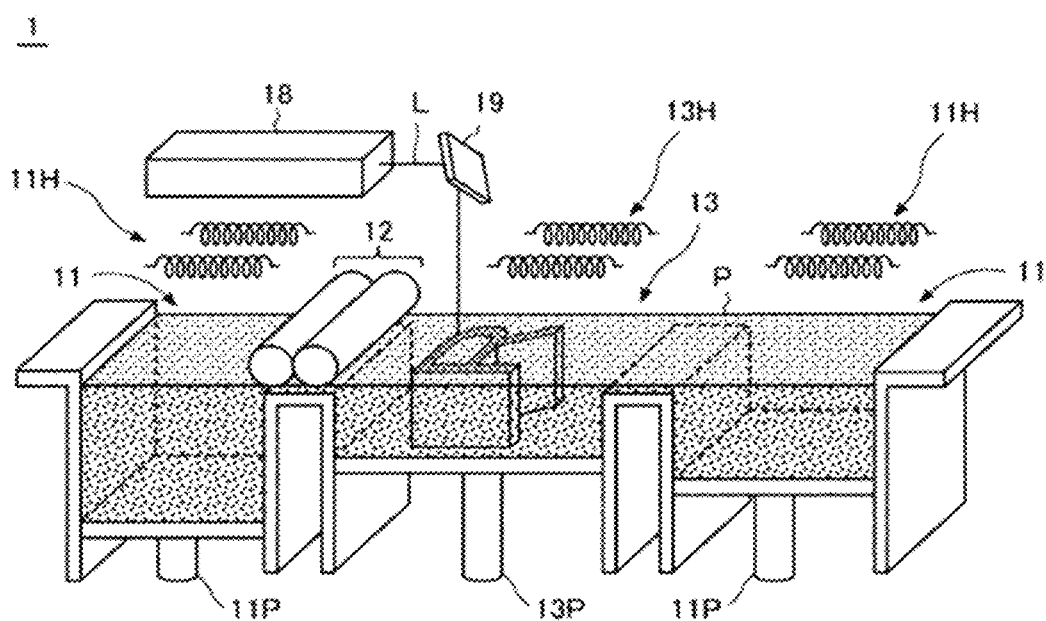

The apparatus for producing a three-dimensional object using the above-described resin particles for forming a three-dimensional object will be described with reference to FIG. 11. FIG. 11 is a schematic view illustrating an apparatus for producing a three-dimensional object according to one aspect of the present disclosure.

As illustrated in FIG. 11, a forming device 1 includes a supply tank 11 as one example of a storing unit configured to store resin particles for forming a three-dimensional object (may be referred to as a resin powder for forming hereinafter) P, a roller 12 configured to supply the resin powder P stored in the supply tank 11, a laser scanning space 13 in which the resin powder P supplied by the roller 12 is arranged and laser L is scanned, an electromagnetic source 18 that is an irradiation source of laser L serving as electromagnetic radiations, and a reflector 19 configured to reflect laser L emitted from the electromagnetic source 18 to a predetermined position in the laser scanning space 13. Moreover, the forming device 1 includes heaters 11H and 13H configured to heat the supply tank 11 and the resin powder P stored in the laser scanning space 13, respectively.

A reflective surface of the reflector 19 moves based on two-dimensional date of a three-dimensional (3D) model when the electromagnetic source 18 emits laser L. The two-dimensional data of the 3D model gives each cross-sectional shape when the 3D model is sliced at a certain gap. Laser L is selectively emitted to the area indicated by the two-dimensional data within the laser scanning space 13 by changing the reflection angle of the laser L. The resin powder at the laser L irradiation position is melted and sintered to form a layer. Specifically, the electromagnetic source 18 functions as a layer forming unit configured to form each layer of a formed object from the resin powder P.

Moreover, pistons 11P and 13P are respectively disposed in the supply tank 11 and laser scanning space 13 of the forming device 1. When the formation of the layer is completed, the pistons 11P and 13P move in a manner that the supply tank 11 and the laser scanning space 13 are moved up and down in the laminating direction of the formed product. As a result, the fresh resin powder to be used for formation of a new layer can be supplied from the supply tank 11 to the laser scanning space 13.

The forming device 1 selectively melts the resin powder P with changing an irradiation position of laser by the reflector 19, but the present disclosure is not limited to such an embodiment. The resin powder of the present disclosure is also suitably used for a forming device of a selective mask sintering (SMS) method. In the SMS method, for example, part of the resin powder is masked with a shielding mask and electromagnetic irradiation is performed to apply electromagnetic radiations, such as infrared rays, to the area not covered with the mask to thereby selectively melt the resin powder to perform forming. In the case where the SMS method is used, the resin powder P preferably includes one or more kinds of a heat absorbent or dark substance to increase infrared absorbing properties. Examples of the heat absorbent and dark substance include carbon fibers, carbon black, carbon nanotubes, and cellulose nanofibers. As the SMS method, for example, the method disclosed in U.S. Pat. No. 6,531,086 can be suitably used.

Next, an embodiment of the method for producing a three-dimensional object of the present disclosure will be described with reference to FIGS. 12 to 13.

FIGS. 12A, 12B, 13A, and 13B are conceptual views for describing a method for producing a three-dimensional object.

Figure 12A:
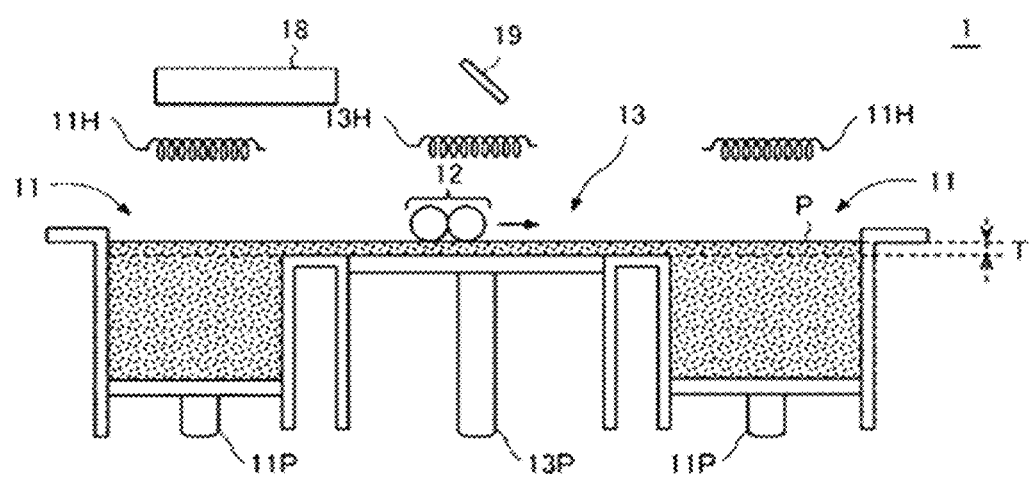

The resin powder P stored in the supply tank 11 is heated by the heater 11H. A temperature of the supply tank 11 is preferably as high as possible but equal to or below a melting point of the resin particles P in view of inhibition of splash back at the time of melting the resin particles P by laser irradiation. In view of prevention of melting of the resin powder P in the supply tank 11, however, the temperature of the supply tank 11 is preferably a temperature lower than the melting point of the resin powder P by 10° C. or greater. As illustrated in FIG. 12A, an engine of the forming device 1 drives the roller 12 to supply and level the resin powder P of the supply tank 11 into the laser scanning space 13 to form a powder layer having a thickness T for one layer, as one example of the supplying step. During the process as mentioned, the resin powder P is laminated as in FIG. 3, FIG. 4, or FIG. 5 depending on the shape or distribution of the resin particles. The resin powder P supplied to the laser scanning space 13 is heated by the heater 13H. The temperature of the laser scanning space 13 is preferably as high as possible in view of inhibition of splash back at the time of melting the resin particles P by laser irradiation. In view of prevention of melting of the resin powder P in the laser scanning space 13, however, the temperature of the laser scanning space 13 is preferably a temperature lower than the melting point of the resin powder P by 5° C. or greater.

Figure 12B:
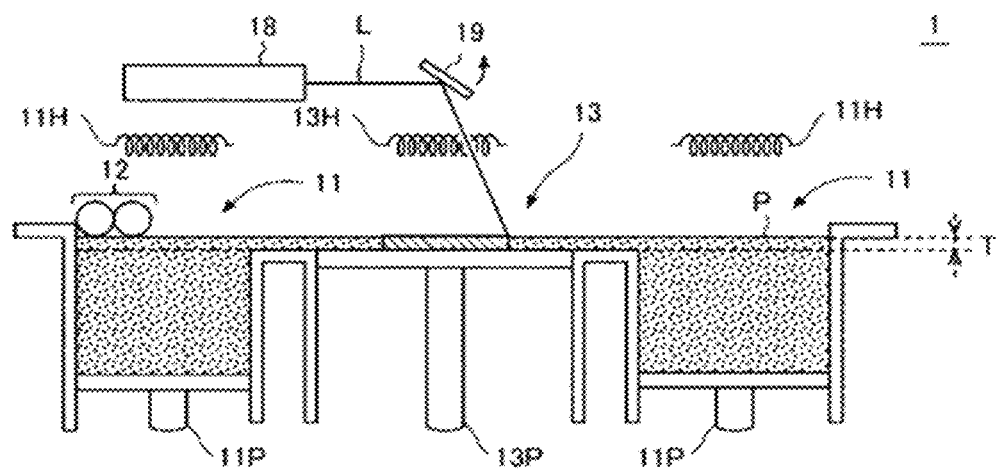

The engine of the forming device 1 receives a plurality of inputs of two-dimensional data generated from a 3D model. As illustrated in FIG. 12B, the engine of the forming device 1 applies laser from the electromagnetic source 18 with moving a reflection surface of the reflector 19 based on the two-dimensional data at the most bottom surface side among plurality of the two-dimensional data. The output of laser is not particularly limited and may be appropriately selected depending on the intended purpose. The output is preferably 10 W or greater but 150 W or less. As a result of the laser irradiation, the position of the resin powder P corresponding to the pixels designated by the two-dimensional data at the most bottom surface side is melted within the powder layer.

Once the laser irradiation is completed, the melted resin is cured, and a sintered layer in the shape designated by the two-dimensional data at the most bottom surface side is formed.

A thickness T of the sintered layer is not particularly limited. An average value of the thickness T is preferably 10 μm or greater, more preferably 50 μm or greater, and even more preferably 100 μm or greater. Moreover, the thickness T of the sintered layer is not particularly limited, but the average value of the thickness T is preferably less than 500 μm, more preferably less than 300 μm, and even more preferably less than 200 μm.

Figure 13A:
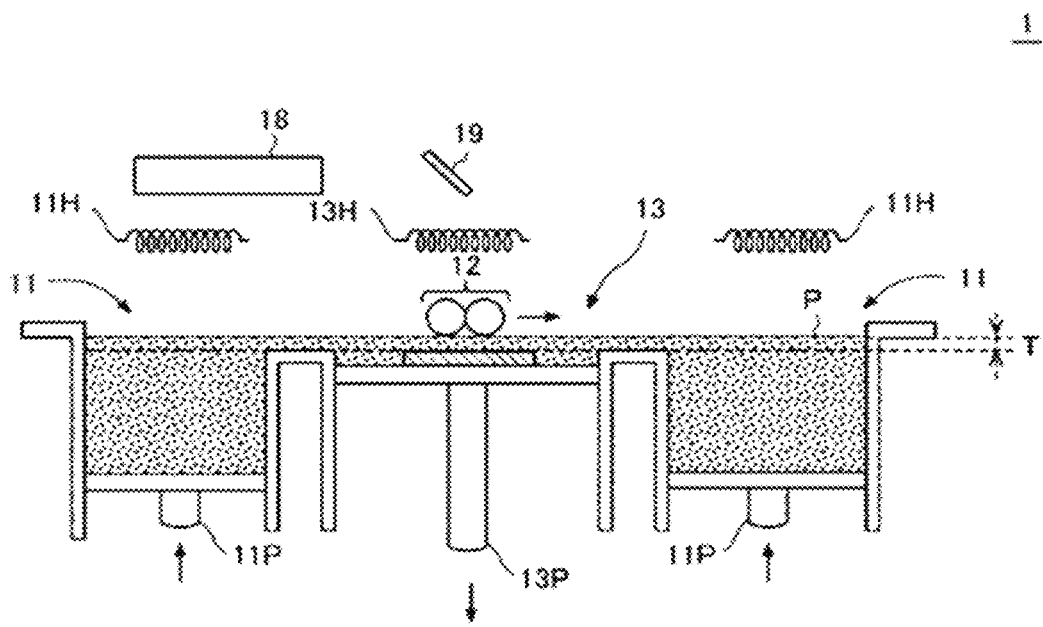

As illustrated in FIG. 13A, once the sintered layer at the most bottom surface side is formed, the engine of the forming device 1 drops the laser scanning space 13 by the thickness T for one layer with the piston 13P to form a forming space of a thickness T for one layer in the laser scanning space 13. Moreover, the engine of the forming device 1 lifts the piston 11P to be able to supply a fresh resin powder P. Subsequently, the engine of the forming device 1 drives the roller 12 to supply and level the resin powder P of the supply tank 11 in the laser scanning space 13 to form a powder layer having the thickness T for one layer, as illustrated in FIG. 13A.

Figure 13B:
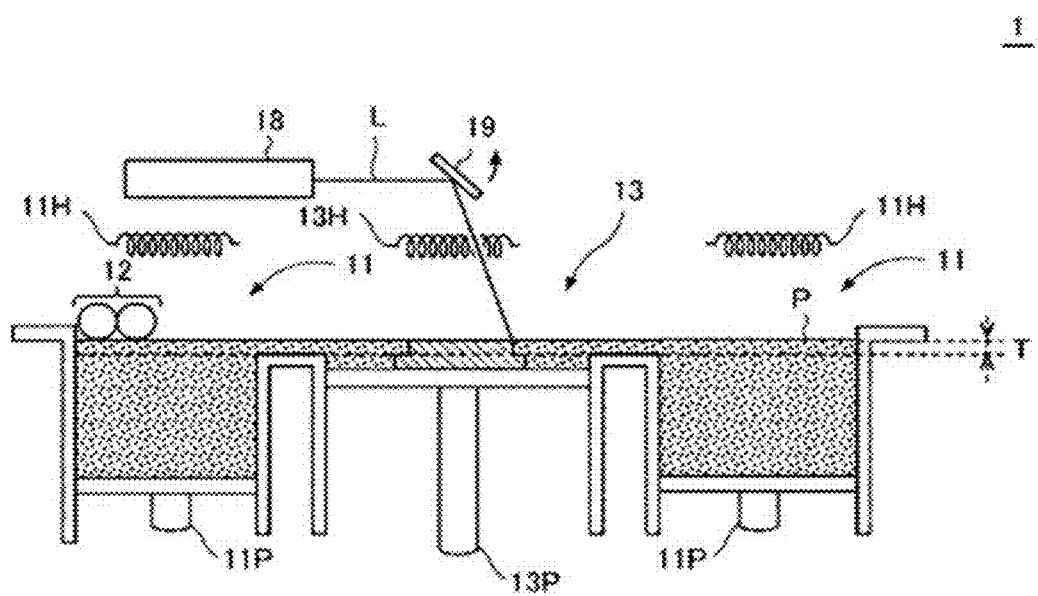

As illustrated in FIG. 13B, the engine of the forming device 1 applies laser from the electromagnetic source 18 with moving the reflective surface of the reflector 19 based on the two-dimensional data of the second layer from the most bottom surface side among the plurality of two-dimensional data. As a result, the position of the resin powder P corresponding to the pixels designated by the two-dimensional data of the second layer from the most bottom surface side is melted within the powder layer. Once the laser irradiation is completed, the melted resin is cured, and a sintered layer in the shape designated by the two-dimensional data of the second layer from the most bottom surface side is formed in the state where the sintered layer is laminated on the sintered layer at the most bottom surface side.

The forming device 1 repeats the above-described supplying step and layer-forming step to laminate sintered layers. As the sintered formed layers are laminated to complete forming based on all of the plurality of two-dimensional data, a three-dimensional object having an identical shape to the shape of the 3D model can be obtained.

The columnar resin particles each including the fibrous material are melted by applying energy that melt the columnar resin particles, such as laser and infrared rays, and are melted and fused together with other columnar resin particles present between laminated layers, and are moreover melted and fused together with the underlying formed layer that is formed earlier. Therefore, formed layers are laminated towards upper layers to proceed forming with maintaining the direction of alignment of the fibrous material approximately the same.

<Specific Embodiment of Method for Producing Three-Dimensional Object>

A preferably embodiment of the method for producing a three-dimensional object will be described below.

The method for producing a three-dimensional object of the present disclosure includes using the above-described resin particles for forming a three-dimensional object, and laminating cured layers of the resin particles for forming a three-dimensional object to form a three-dimensional object.

The method for producing a three-dimensional object of the present disclosure includes a first forming step including performing forming with aligning a fibrous material in the resin particles with a height direction for laminating when cured layers are laminated.

As a result, the strength along the height direction (Z direction) of formed layers constituting a three-dimensional object can be improved.

Moreover, the method for producing a three-dimensional object of the present disclosure preferably includes a second forming step including performing forming with aligning the fibrous material in the resin particles with a direction parallel to a laminating surface when cured layers are laminated.

As a result, the strength along the direction (XY direction) parallel to the laminating surface of formed layers constituting a three-dimensional object can be improved.

<Three-Dimensional Object>

A three-dimensional object is suitably produced by the method for producing a three-dimensional object of the present disclosure.

The obtained three-dimensional object of the present disclosure has the following characteristics when the direction of the fibrous material in the three-dimensional object is observed.

In the three-dimensional object of the present disclosure, specifically, a ratio of the filaments of the fibrous material aligned in a first direction and a second direction orthogonal to the first direction is 90% or greater and more preferably 95% or greater relative to the entire filaments of the fibrous material in the three-dimensional object.

The directions of the filaments of the fibrous material in the three-dimensional object can be confirmed by cutting the three-dimensional object with a focused ion beam to expose a cross-section thereof, and observing the cross-section under an SEM.

The observation range is, for example, randomly selected 50 points on the cross-section of the three-dimensional object.

In the above-described range, the alignment directions of the filaments of the fibrous material are observed. The difference between the first direction and the second direction is 90°. The direction that is ±30° from the first direction or the second direction is regarded as within the scope of the first direction or the second direction.

The number of filaments of the fibrous material aligned in the first direction and the second direction is counted, and the number of filaments of the fibrous material not aligned in the first direction and the second direction is also counted. More specifically, the number of filaments of the fibrous material aligned in the height direction (Z direction) for laminating formed layer of a three-dimensional object and the number of filaments of the fibrous material aligned in the direction (XY direction) parallel to a laminating surface of the formed layers (including the filaments aligning with the approximate Z direction and the approximate XY direction that are within ±30° from the Z direction and the XY direction) are counted. Moreover, the number of filaments of the fibrous material aligning a direction other than the Z direction and the XY direction is also counted. Then, the ratio of the fibrous material aligning with the first direction and the second direction relative to the entire fibrous material in the three-dimensional object is determined. The ratio is calculated as an average value of the observed 50 points.

In the present disclosure, the ratio of the fibrous material aligning the first direction and the second direction is regarded as the value of the entire three-dimensional object by determining an average value of randomly selected 50 points of the three-dimensional object.

EXAMPLES

The present disclosure will be described below by way of Examples. The present disclosure should not be construed as being limited to these Examples.

Example 1

Production of First Resin Particle Group

A polybutylene terephthalate (PBT) resin in an amount of 850 parts by mass and 150 parts by mass of glass fibers were dry mixed. After sintering the resultant mixture at a temperature higher than the melting point of PBT by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 60 μm by stretching in 4-fold.

As the polybutylene terephthalate (PBT) resin, a resin [product name: Novaduran5020 (available from Mitsubishi Engineering-Plastics Corporation), melting point: 218° C., glass transition temperature: 43° C.] was used. As the glass fibers serving as a fibrous material (fibrous filler), moreover, glass fibers [product name: ECS03-167S (available from Central Glass Fiber Co., Ltd.), linear diameter: 9 μm] were used.

Thereafter, the formed fibers are disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 30 μm. The resultant was provided as resin particles for forming a three-dimensional object of Example 1. As the size of the columnar resin particles of the resin particles for forming a three-dimensional object of Example 1, the maximum diameter was 60 μm and the height was 30 μm.

Example 2

Production of First Resin Particle Group

A polybutylene terephthalate (PBT) resin in an amount of 850 parts by mass and 150 parts by mass of carbon fibers were dry mixed. After sintering the resultant mixture at a temperature higher than the melting point of PBT by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 40 μm by stretching in 4-fold.

As the polybutylene terephthalate (PBT) resin, a resin [product name: Novaduran5020 (available from Mitsubishi Engineering-Plastics Corporation), melting point: 218° C., glass transition temperature: 43° C.] was used. As the carbon fibers serving as a fibrous material (fibrous filler), moreover, carbon fibers [product name: XN-100-01Z (available from Nippon Graphite Fiber Co., Ltd.), linear diameter: 10 μm] were used.

Thereafter, the formed fibers were disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 20 μm. The resultant was provided as resin particles for forming a three-dimensional object of Example 2. As the size of the resin particles for forming a three-dimensional object of Example 2, the maximum diameter was 40 μm and the height was 20 μm.

Example 3

Production of First Resin Particle Group

A polybutylene terephthalate (PBT) resin in an amount of 850 parts by mass and 150 parts by mass of glass fibers were dry mixed. After sintering the resultant mixture at a temperature higher than the melting point of PBT by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 100 μm by stretching in 4-fold.

As the polybutylene terephthalate (PBT) resin, a resin [product name: Novaduran5020 (available from Mitsubishi Engineering-Plastics Corporation), melting point: 218° C., glass transition temperature: 43° C.] was used. As the glass fibers serving as a fibrous material (fibrous filler), moreover, glass fibers [product name: ECS03-167S (available from Central Glass Fiber Co., Ltd.), linear diameter: 9 μm] were used.

Thereafter, the formed fibers were disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 8 μm. The resultant was provided as resin particles for forming a three-dimensional object of Example 3. As the size of the columnar resin particles of the resin particles for forming a three-dimensional object of Example 3, the maximum diameter was 100 μm and the height was 8 μm.

Example 4

Production of First Resin Particle Group

Resin particles for forming a three-dimensional object of Example 4 were obtained in the same manner as in Example 1, except that the cut width was adjusted to be 40 μm. As the size of the columnar resin particles of the resin particles for forming a three-dimensional object of Example 4, the maximum diameter was 60 μm and the height was 40 μm.

Example 5

Production of First Resin Particle Group

A polyether ether ketone (PEEK) resin in an amount of 700 parts by mass and 300 parts by mass of glass fibers were dry mixed. After sintering the resultant mixture at a temperature higher than the melting point of PEEK by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 60 μm by stretching in 4-fold.

As the polyether ether ketone (PEEK) resin, a resin [product name: HT P22PF (available from VICTREX), melting point: 343° C., glass transition temperature: 143° C.] was used. As the glass fibers serving as a fibrous material (fibrous filler), moreover, glass fibers [product name: ECS03-167S (available from Central Glass Fiber Co., Ltd.), and linear diameter: 9 μm] were used.

Thereafter, the formed fibers were disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 30 μm. The resultant was provided as resin particles for forming a three-dimensional object of Example 5. As the size of the columnar resin particles of the resin particles for forming a three-dimensional object of Example 5, the maximum diameter was 60 μm and the height was 30 μm.

Example 6

Production of First Resin Particle Group

A polybutylene terephthalate (PBT) resin in an amount of 900 parts by mass and 100 parts by mass of glass fibers were dry mixed. After sintering the resultant mixture at a temperature higher than the melting point of PBT by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 150 μm by stretching in 4-fold.

As the polybutylene terephthalate (PBT) resin, a resin [product name: Novaduran5020 (available from Mitsubishi Engineering-Plastics Corporation), melting point: 218° C., glass transition temperature: 43° C.] was used. As the glass fibers serving as a fibrous material (fibrous filler), moreover, glass fibers [product name: ECS03-167S (available from Central Glass Fiber Co., Ltd.), linear diameter: 9 μm] were used.

Thereafter, the formed fibers were disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 6 μm. The resultant was provided as resin particles for forming a three-dimensional object of Example 6. As the size of the columnar resin particles of the resin particles for forming a three-dimensional object of Example 6, the maximum diameter was 150 μm and the height was 6 μm.

However, the resin particles for forming a three-dimensional object of Example 6 included resin particles that did not have desirable column shapes, and the production accuracy of the columnar resin particles was inferior to other Examples. Note that, the results presented in the table below are the results of evaluation performed only on the resin particles having desired column shapes.

Example 7

Production of Second Resin Particle Group

Resin particles for forming a three-dimensional object of Example 7 were obtained in the same manner as in Example 1, except that the cut speed (shorts per minute) was adjusted to 150 spm to adjust the cut width to 420 μm. As the size of the columnar resin particles of the resin particles for forming a three-dimensional object of Example 7, the maximum diameter was 60 μm and the height was 420 μm.

Example 8

Production of Second Resin Particle Group

Resin particles for forming a three-dimensional object of Example 8 were obtained in the same manner as in Example 2, except that the cut width was adjusted to 200 μm. As the size of the columnar resin particles of the resin particles for forming a three-dimensional object of Example 8, the maximum diameter was 40 μm and the height was 200 μm.

Example 9

Production of Second Resin Particle Group

A polybutylene terephthalate (PBT) resin in an amount of 850 parts by mass and 150 parts by mass of glass fibers were dry mixed. After sintering the resultant mixture at a temperature higher than the melting point of PBT by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 100 μm by stretching in 4-fold.

As the polybutylene terephthalate (PBT) resin, a resin [product name: Novaduran5020 (available from Mitsubishi Engineering-Plastics Corporation), melting point: 218° C., glass transition temperature: 43° C.] was used. As the glass fibers serving as a fibrous material (fibrous filler), moreover, glass fibers [product name: ECS03-167S (available from Central Glass Fiber Co., Ltd.), linear diameter: 9 μm] were used.

Thereafter, the formed fibers were disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 125 μm. The resultant was provided as resin particles for forming a three-dimensional object of Example 9. As the size of the columnar resin particles of the resin particles for forming a three-dimensional object of Example 9, the maximum diameter was 100 μm and the height was 125 μm.

Example 10

Production of Second Resin Particle Group

A polybutylene terephthalate (PBT) resin in an amount of 900 parts by mass and 100 parts by mass of glass fibers were dry mixed. After sintering the resultant mixture at a temperature higher than the melting point of PBT by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 30 μm by stretching in 4-fold.

As the polybutylene terephthalate (PBT) resin, a resin [product name: Novaduran5020 (available from Mitsubishi Engineering-Plastics Corporation), melting point: 218° C., glass transition temperature: 43° C.] was used. As the glass fibers serving as a fibrous material (fibrous filler), moreover, glass fibers [product name: ECS03-167S (available from Central Glass Fiber Co., Ltd.), linear diameter: 9 μm] were used.

Thereafter, the formed fibers were disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 420 μm. The resultant was provided as resin particles for forming a three-dimensional object of Example 10. As the size of the columnar resin particles of the resin particles for forming a three-dimensional object of Example 10, the maximum diameter was 30 μm and the height was 420 μm.

Example 11

Production of Second Resin Particle Group

Resin particles for forming a three-dimensional object of Example 11 were obtained in the same manner as in Example 10, except that the cut width was adjusted to 520 μm. As the size of the columnar resin particles of the resin particles for forming a three-dimensional object of Example 11, the maximum diameter was 30 μm and height was 520 μm.

Example 12

Mixing First Resin Particle Group and Second Resin Particle Group

The resin particles for forming a three-dimensional object of Example 1 and the resin particles for forming a three-dimensional object of Example 7 were mixed at a ratio of 60:40, to thereby obtain resin particles for forming a three-dimensional object of Example 12.

Example 13

Mixing First Resin Particle Group and Second Resin Particle Group

The resin particles for forming a three-dimensional object of Example 2 and the resin particles for forming a three-dimensional object of Example 8 were mixed at a ratio of 75:25, to thereby obtain resin particles for forming a three-dimensional object of Example 13.

Comparative Example 1

A polybutylene terephthalate (PBT) resin in an amount of 900 parts by mass was used. After sintering the PBT at a temperature higher than the melting point of PBT by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 60 μm by stretching in 4-fold.

As the polybutylene terephthalate (PBT) resin, a resin [product name: Novaduran5020 (available from Mitsubishi Engineering-Plastics Corporation), melting point: 218° C., glass transition temperature: 43° C.] was used.

Thereafter, the formed fibers were disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 60 μm.

The resultant resin powder in an amount of 850 parts by mass and 150 parts by mass of glass fibers [product name: ECS03-167S (available from Central Glass Fiber Co., Ltd.), linear diameter: 9 μm] serving as a fibrous material (fibrous filler) were dry mixed to obtain resin particles for forming a three-dimensional object of Comparative Example 1.

Comparative Example 2

A polyether ether ketone (PEEK) resin in an amount of 700 parts by mass was used. After sintering the PEEK at a temperature higher than the melting point of PEEK by 30° C., a resin solution for forming a three-dimensional object was stretched into fibers by means of an extrusion device having a circular nozzle opening shape (available from The Japan Steel Works, LTD.). The fibers were adjusted to have a fiber diameter (diameter) of 60 μm by stretching in 4-fold.

As the polyether ether ketone (PEEK) resin, a resin [product name: HT P22PF (available from VICTREX), melting point: 343° C., glass transition temperature: 143° C.] was used Thereafter, the formed fibers were disposed with aligning with the same direction, and pressure of 10 MPa was applied with heating at a temperature lower than a melting point of the resin by 50° C. to integrate into a sheet. Note that, a cross-sectional shape of each fiber integrated into the sheet was an approximate polygon. Moreover, the fibers integrated into the sheet was cut by means of a press-cut cutting device (NJ series 1200, available from OGINO SEIKI CO., LTD.) with adjusting a cut width to 60 μm.

The resultant resin powder in an amount of 850 parts by mass and 300 parts by mass of glass fibers [product name: ECS03-167S (available from Central Glass Fiber Co., Ltd.), linear diameter: 9 μm] serving as a fibrous material (fibrous filler) were dry mixed to obtain resin particles for forming a three-dimensional object of Comparative Example 2.

Examples 1 to 13 and Comparative Examples 1 to 2

<Laminating Direction of Resin Particles>

Each of the resin particles for forming a three-dimensional object of Examples 1 to 13 and Comparative Examples 1 to 2 were placed in a supply bed of an SLS system forming device (AM S5500P, available from Ricoh Company Limited) and production of a three-dimensional object was performed. As setting conditions, formed layers were formed with a layer average thickness of 0.15 mm. The directions of fibers in 300 columnar resin particles in the laminated formed layers were confirmed.

Note that, as the directions of the fibers, a ratio of the fibers aligning with the Z direction was judged with also considering the directions ±45° from a cut surface of the powder particle that was a standard.

<Strength of Formed Object>

Next, the obtained resin particles for forming a three-dimensional object were added to a supply bed of an SLS-system forming device (AM S5500P, available from Ricoh Company Limited) and production of a three-dimensional object was performed.

As the setting conditions, a layer average thickness was set to 0.15 mm, laser output was set to 10 W or greater but 150 W or less, a laser scanning space was set to 0.1 mm, and a temperature lower than the melting point by 3° C. was used as a floor temperature of the parts. By means of the SLS-system forming device, 5 tensile test specimens (XY formed objects) whose long sides faced the XY planar direction (a planar direction along which the roller 12 moved in FIG. 11) and 5 tensile test specimens (Z formed objects) whose long sides faced the direction vertical to the surface along which the roller 12 moved in FIG. 11) were formed in the center part of the laser scanning space 13. A gap between the formed objects was 5 mm or greater. The tensile test specimens were each an ISO (the International Organization for Standardization) 3167 Type 1A multipurpose dog-born-shaped test specimen (specimen had a center portion having a length of 80 mm, a thickness of 4 mm, and a width of 10 mm). The forming time was set to 50 hours.

Note that, the test speed of the tensile test was constant and set to 50 mm/min. Moreover, the tensile strength was tested on each tensile test specimen 5 times, and an average value of the obtained measured value was determined as the tensile strength.

TABLE 1

| | Resin | Fibrous filler | Height/ Max diameter | Ratio of alignment in Z direction (%) | Tensile strength (MPa) Z direction | Tensile strength (MPa) XY direction |
|---|---|---|---|---|---|---|
| Ex. 1 | PBT | Glass fibers | 0.5 | 80 | 65 | 70 |
| Ex. 2 | PBT | Carbon fibers | 0.5 | 75 | 75 | 70 |
| Ex. 3 | PBT | Glass fibers | 0.08 | 98 | 54 | 60 |
| Ex. 4 | PBT | Glass fibers | 0.67 | 63 | 85 | 82 |
| Ex. 5 | PEEK | Glass fibers | 0.5 | 77 | 108 | 148 |
| Ex. 6 | PBT | Glass fibers | 0.04 | 100 | 50 | 58 |
| Ex. 7 | PBT | Glass fibers | 7 | 1 | 34 | 95 |
| Ex. 8 | PBT | Carbon fibers | 5 | 5 | 36 | 125 |
| Ex. 9 | PBT | Glass fibers | 1.25 | 25 | 50 | 85 |
| Ex. 10 | PBT | Glass fibers | 14 | 1 | 35 | 98 |
| Ex. 11 | PBT | Glass fibers | 17.3 | 1 | 33 | 103 |
| Ex. 12 | PBT | Glass fibers | 0.5/7 = 60:40 | 50 | 53 | 85 |
| Ex. 13 | PBT | Glass fibers | 0.5/5 = 75:25 | 60 | 60 | 80 |
| Comp. Ex. 1 | PBT | Glass fibers dry mixing | | 0 | 30 | 90 |

TABLE 1-continued

| | Resin | Fibrous filler | Height/ Max diameter | Ratio of alignment in Z direction (%) | Tensile strength (MPa) | |
|---|---|---|---|---|---|---|
| | | | | | Z direction | XY direction |
| Comp. Ex. 2 | PEEK | Glass fibers dry mixing | | 0 | 55 | 158 |

The tensile strength of Examples 1 to 6 in the Z direction was significantly improved compared to the tensile strength of Comparative Example 1 in the Z direction. Since the fibrous material was mainly aligned in the XY direction in Examples 7 to 10, the tensile strength in the XY direction was significantly improved. In Example 5, PEEK was used as the resin. However, the tensile strength of Example 5 in the Z direction was high compared to Comparative Example 2, regardless of a type of the resin for use. In Examples 12 and 13, the first resin particle group and the second resin particle group were mixed and used as resin particles, but the tensile strength in Z direction was noticeably different depending on the ratio of the particles aligning the Z direction.

Note that, as observed from the results of Table 1, the resin particles for forming a three-dimensional object of Example 11 had improved strength in the XY direction, but precision was poor at the edges of the formed object compared to other Examples because the size of the particles was larger than 500 μm.

For example, embodiments of the present disclosure are as follows.

<1> Resin particles including:
columnar resin particles each including filaments of a fibrous material, wherein the filaments of the fibrous material are aligned in an axial direction of each of the columnar resin particles.

<2> The resin particles according to <1>,
wherein, when a surface of the columnar resin particle formed vertical to the axial direction is determined as a bottom surface of the columnar resin particle and a distance between the bottom surface and a surface of the columnar resin particle facing the bottom surface is determined as a height of the columnar resin particle, the columnar resin particles, in which a maximum diameter of the bottom surface of each of the columnar resin particles is greater than the height of each of the columnar resin particles, are first resin particles.

<3> The resin particles according to <2>,
wherein the first resin particles have a ratio (height/maximum diameter) of 0.05 times or greater but 0.7 times or less, where the ratio is a ratio of the height to the maximum diameter.

<4> The resin particles according to <1>,
wherein, when a surface of the columnar resin particle formed vertical to the axial direction is determined as a bottom surface of the columnar resin particle and a distance between the bottom surface and a surface of the columnar resin particle facing the bottom surface is determined as a height of the columnar resin particle, the columnar resin particles, in which the height of each of the columnar resin particles is greater than a maximum diameter of the bottom surface of each of the columnar resin particles, are second resin particles.

<5> The resin particles according to <4>,
wherein the second resin particles have a ratio (height/maximum diameter) of 1.1 times or greater but 15 times or less, where the ratio is a ratio of the height to the maximum diameter.

<6> The resin particles according to any one of <1> to <5>,
wherein a resin component of the columnar resin particles is selected from the group consisting of polybutylene terephthalate, polyamide, polyacetal, and polyether ether ketone.

<7> The resin particles according to any one of <1> to <6>,
wherein the resin particles are resin particles for forming a three-dimensional object, where the resin particles are a material for producing a three-dimensional object.

<8> A method for producing columnar resin particles each including filaments of a fibrous material, the method including:
stretching a resin particle forming material into fibers, where the resin particle forming material includes a resin and filaments of a fibrous material; and
cutting the fibrous resin particle forming material obtained by the stretching to form columnar resin particles, to thereby form columnar resin particles in each of which the filaments of the fibrous material are aligned in an axial direction of each of the columnar resin particles.

<9> The method according to <8>,
wherein the cutting includes either producing first resin particles or producing second resin particles, or both producing the first resin particles and producing the second resin particles with adjusting a cutting width, wherein the first resin particles are columnar resin particles, in which a maximum diameter of a bottom surface of each of the columnar resin particles is greater than a height of each of the columnar resin particles, and the second resin particles are columnar resin particles, in which the height of each of the columnar resin particles is greater than the maximum diameter of the bottom surface of each of the columnar resin particles.

<10> An apparatus for producing a three-dimensional object, the apparatus including:
a supply tank configured to store resin particles for forming a three-dimensional object including a resin particle group where the resin particle group includes columnar resin particles each including filaments of a fibrous material; and
a supply unit of resin particles for forming a three-dimensional object where the supply unit is configured to supply the resin particles for forming a three-dimensional object from the supply tank,
wherein the apparatus for producing a three-dimensional object is an apparatus configured to laminate cured layers of the resin particles for forming a three-dimensional object to form a three-dimensional object,
wherein the resin particles for forming a three-dimensional object include the columnar resin particles, in each of which the filaments of the fibrous material are aligned in an axial direction of each of the columnar resin particles,
wherein, when a surface of the columnar resin particle formed vertical to the axial direction of the columnar resin particle is determined as a bottom surface of the columnar resin particle and a distance between the bottom surface and a surface of the columnar resin particle facing the bottom surface is determined as a height of the columnar resin particle, the resin particles include a first resin particle group and a second resin particle group, where the first resin particle group includes first resin particles, in which the maximum diameter of the bottom surface of each of the resin particles is greater than the height of each of the resin particles, and the second resin particle group includes second resin particles, in which the height of each of the resin particles is greater than the maximum diameter of the bottom surface of each of the resin particles.

<11> A method for producing a three-dimensional object, the method including:

laminating cured layers of resin particles for forming a three-dimensional object to form a three-dimensional object, where the resin particles for forming a three-dimensional object include resin particles groups each including columnar resin particles where the columnar resin particles each include filaments of a fibrous material, wherein the resin particles for forming a three-dimensional object include the columnar resin particles, where the filaments of the fibrous material are aligned in an axial direction of each of the columnar resin particles, wherein, when a surface of the columnar resin particle formed vertical to the axial direction of the columnar resin particle is determined as a bottom surface of the columnar resin particle and a distance between the bottom surface and a surface of the columnar resin particle facing the bottom surface is determined as a height of the columnar resin particle, the resin particles include a first resin particle group and a second resin particle group, where the first resin particle group includes first resin particles, in which the maximum diameter of the bottom surface of each of the resin particles is greater than the height of each of the resin particles, and the second resin particle group includes second resin particles, in which the height of each of the resin particles is greater than the maximum diameter of the bottom surface of each of the resin particles.

<12> A method for producing a three-dimensional object, the including:

laminating cured layers of resin particles for forming a three-dimensional object to form a three-dimensional object, where the resin particles for forming a three-dimensional object include resin particles groups each including columnar resin particles where the columnar resin particles each include filaments of a fibrous material; and performing first forming with aligning the filaments of the fibrous material in the resin particles with a height direction along which the cured layers are laminated.

<13> The method according to <12>, further including performing second forming with aligning the filaments of the fibrous material in the resin particles with a direction horizontal to a laminate surface on which the cured layers are laminated.

<14> A three-dimensional object including:

a fibrous material, wherein, when directions of the filaments of the fibrous material in the three-dimensional object are observed, a ratio of the filaments of the fibrous material aligned in two directions including a first direction and a second direction orthogonal to the first direction is 90% or greater relative to the entire filaments of the fibrous material in the three-dimensional object.

The resin particles according to any one of <1> to <7>, the method for producing resin particles according to <8> or <9>, the apparatus for producing a three-dimensional object according to <10>, the method for producing a three-dimensional object according to any one of <11> to <13>, and the three-dimensional object according to <14> can solve the above-mentioned various problems existing in the art and can achieve the object of the present disclosure.

What is claimed is:

1. Resin particles comprising:
columnar resin particles each including filaments of a fibrous material,
wherein the filaments of the fibrous material are aligned in an axial direction of each of the columnar resin particles, and
wherein a height of the columnar resin particles is 5 µm or greater but 500 µm or less.

2. The resin particles according to claim 1,
wherein, when a surface of the columnar resin particle formed vertical to the axial direction is determined as a bottom surface of the columnar resin particle and a distance between the bottom surface and a surface of the columnar resin particle facing the bottom surface is determined as a height of the columnar resin particle, the columnar resin particles, in which a maximum diameter of the bottom surface of each of the columnar resin particles is greater than the height of each of the columnar resin particles, are first resin particles.

3. The resin particles according to claim 2,
wherein the first resin particles have a ratio (height/maximum diameter) of 0.05 times or greater but 0.7 times or less, where the ratio is a ratio of the height to the maximum diameter.

4. The resin particles according to claim 1,
wherein, when a surface of the columnar resin particle formed vertical to the axial direction is determined as a bottom surface of the columnar resin particle and a distance between the bottom surface and a surface of the columnar resin particle facing the bottom surface is determined as a height of the columnar resin particle, the columnar resin particles, in which the height of each of the columnar resin particles is greater than a maximum diameter of the bottom surface of each of the columnar resin particles, are second resin particles.

5. The resin particles according to claim 4,
wherein the second resin particles have a ratio (height/maximum diameter) of 1.1 times or greater but 15 times or less, where the ratio is a ratio of the height to the maximum diameter.

6. The resin particles according to claim 1,
wherein a resin component of the columnar resin particles is selected from the group consisting of polybutylene terephthalate, polyamide, polyacetal, and polyether ether ketone.

7. The resin particles according to claim 6, wherein the resin is polybutylene terephthalate.

8. The resin particles according to claim 6, wherein the resin is polyether ether ketone.

9. The resin particles according to claim 7, wherein the fibrous material is glass fibers.

10. The resin particles according to claim 7, wherein the fibrous material is carbon fibers.

11. The resin particles according to claim 8, wherein the fibrous material is glass fibers.

12. The resin particles according to claim 1,
wherein the resin particles are resin particles for forming a three-dimensional object, where the resin particles are a material for producing a three-dimensional object.

13. A three-dimensional objected formed from the resin particles of claim 12.

14. A method for producing columnar resin particles each including filaments of a fibrous material, the method comprising:

stretching a resin particle forming material into fibers, where the resin particle forming material includes a resin and filaments of a fibrous material; and cutting the fibrous resin particle forming material obtained by the stretching to form columnar resin particles, to thereby form columnar resin particles in each of which the filaments of the fibrous material are aligned in an axial direction of each of the columnar resin particles, wherein a height of the columnar resin particles is 5 μm or greater but 500 μm or less.

15. The method according to claim 14, wherein the cutting includes either producing first resin particles or producing second resin particles, or both producing the first resin particles and producing the second resin particles with adjusting a cutting width, wherein the first resin particles are columnar resin particles, in which a maximum diameter of a bottom surface of each of the columnar resin particles is greater than a height of each of the columnar resin particles, and the second resin particles are columnar resin particles, in which the height of each of the columnar resin particles is greater than the maximum diameter of the bottom surface of each of the columnar resin particles.

16. Columnar resin particles produced according to the method of claim 14.

17. A method for producing a three-dimensional object, the method comprising:

laminating cured layers of resin particles for forming a three-dimensional object to form a three-dimensional object, where the resin particles for forming a three-dimensional object include resin particles groups each including columnar resin particles where the columnar resin particles each include filaments of a fibrous material, wherein the resin particles for forming a three-dimensional object include the columnar resin particles, where the filaments of the fibrous material are aligned in an axial direction of each of the columnar resin particles, wherein, when a surface of the columnar resin particle formed vertical to the axial direction of the columnar resin particle is determined as a bottom surface of the columnar resin particle and a distance between the bottom surface and a surface of the columnar resin particle facing the bottom surface is determined as a height of the columnar resin particle, the resin particles include a first resin particle group and a second resin particle group, where the first resin particle group includes first resin particles, in which the maximum diameter of the bottom surface of each of the resin particles is greater than the height of each of the resin particles, and the second resin particle group includes second resin particles, in which the height of each of the resin particles is greater than the maximum diameter of the bottom surface of each of the resin particles.

18. A three-dimensional object produced by the method according to claim 17.

* * * * *